(12) United States Patent
Koga

(10) Patent No.: US 10,996,376 B2
(45) Date of Patent: May 4, 2021

(54) OPTICAL ELEMENT AND OPTICAL SYSTEM INCLUDING THE SAME

(71) Applicant: CANON KABUSHIKI KAISHA, Tokyo (JP)

(72) Inventor: Hironobu Koga, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 16/116,530

(22) Filed: Aug. 29, 2018

(65) Prior Publication Data
US 2018/0372918 A1    Dec. 27, 2018

Related U.S. Application Data

(63) Continuation of application No. PCT/JP2017/007636, filed on Feb. 28, 2017.

(30) Foreign Application Priority Data

Mar. 3, 2016    (JP) .............................. JP2016-041578

(51) Int. Cl.
| | |
|---|---|
| *G02B 1/115* | (2015.01) |
| *G02B 5/30* | (2006.01) |
| *G02B 5/00* | (2006.01) |
| *G02B 1/14* | (2015.01) |
| *G02B 5/20* | (2006.01) |

(52) U.S. Cl.
CPC ................ *G02B 1/115* (2013.01); *G02B 1/14* (2015.01); *G02B 5/00* (2013.01); *G02B 5/205* (2013.01); *G02B 5/30* (2013.01)

(58) Field of Classification Search
CPC . G02B 1/115; G02B 5/00; G02B 1/14; G02B 5/205; G02B 5/30; G02B 5/22
See application file for complete search history.

(56) References Cited

U.S. PATENT DOCUMENTS

| | | | | |
|---|---|---|---|---|
| 5,715,103 A | * | 2/1998 | Amano | ................. G02B 5/205 359/580 |
| 2008/0316628 A1 | * | 12/2008 | Nakajima | ............. G02B 5/205 359/888 |
| 2012/0293732 A1 | | 11/2012 | Koike et al. | |

(Continued)

FOREIGN PATENT DOCUMENTS

| | | |
|---|---|---|
| CN | 103688193 A | 3/2014 |
| CN | 103797399 A | 5/2014 |

(Continued)

OTHER PUBLICATIONS

RefractiveIndex.INFO (available at: https://refractiveindex.info/?shelf=main&book=SiO2&page=Rodriguez-de_Marcos, last accessed Jun. 27, 2020). (Year: 2020).*

(Continued)

*Primary Examiner* — Kimberly N. Kakalec
(74) *Attorney, Agent, or Firm* — Canon U.S.A., Inc. IP Division

(57) ABSTRACT

An absorption layer 13 is formed above a substrate 11. The transmittance of the absorption layer 13 varies at different locations of the substrate 11. The absorption layer 13 includes a first material and a second material that have an absorption coefficient that depends on a wavelength. The extinction coefficient of the absorption layer 13 is equal to or less than 0.5 at a wavelength of 400 nm to 700 nm.

21 Claims, 23 Drawing Sheets

(56) References Cited

U.S. PATENT DOCUMENTS

| | | | |
|---|---|---|---|
| 2014/0247480 A1* | 9/2014 | Tatemura | G02B 5/282 |
| | | | 359/359 |
| 2015/0260890 A1* | 9/2015 | Furusato | C23C 14/044 |
| | | | 359/359 |
| 2015/0268394 A1 | 9/2015 | Uchiyama et al. | |
| 2016/0139308 A1* | 5/2016 | Kim | H01L 27/14625 |
| | | | 348/342 |

FOREIGN PATENT DOCUMENTS

| | | | | |
|---|---|---|---|---|
| JP | 62-172691 A | 7/1987 | | |
| JP | 2004-246018 A | 9/2004 | | |
| JP | 2007-178822 A | 7/2007 | | |
| JP | 2009-244531 A | 10/2009 | | |
| JP | 2009-288294 A | 12/2009 | | |
| JP | 2015-222442 A | 12/2015 | | |
| KR | 20140120690 A | * | 10/2014 | ....... H01L 27/14625 |
| WO | 2014/034133 A1 | 3/2014 | | |

OTHER PUBLICATIONS

RefractiveIndex.INFO (available at: https://refractiveindex.info/?shelf=main&book=MgF2&page=Rodriguez-de_Marcos, last accessed Nov. 2, 2020) (Year: 2017).*

Hameed et al. (Preparation and Characterization of Al2O3 Nanostructures by Pulsed-Laser Deposition, J. Optoelectron. Photon. vol. 6, Issue 8, pp. 43-46, 2015). (Year: 2015).*

* cited by examiner

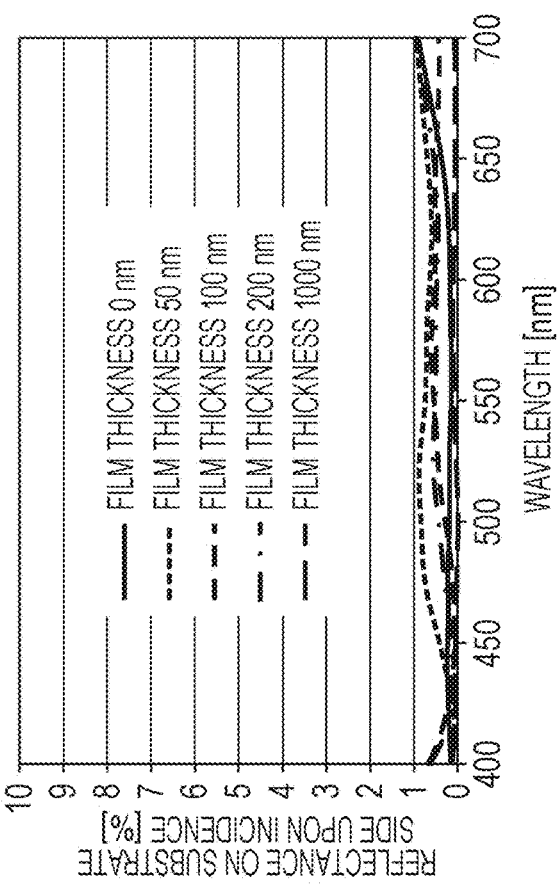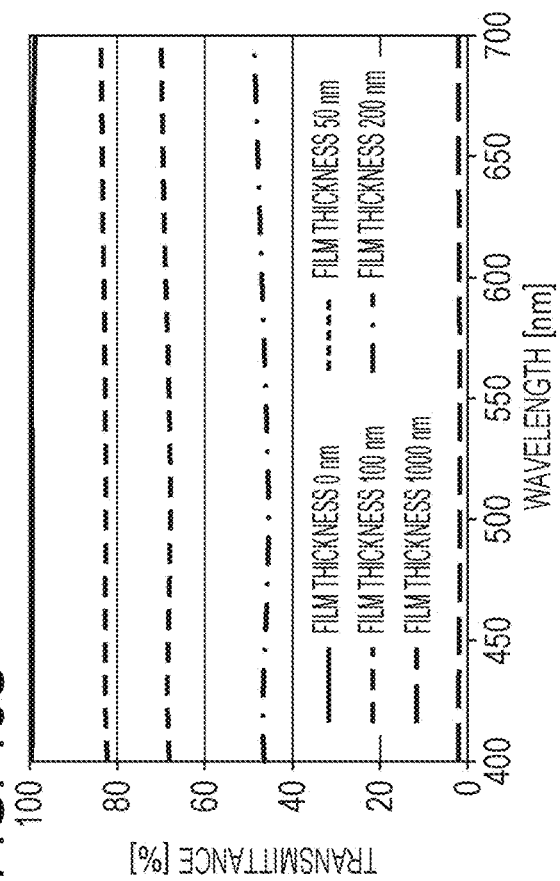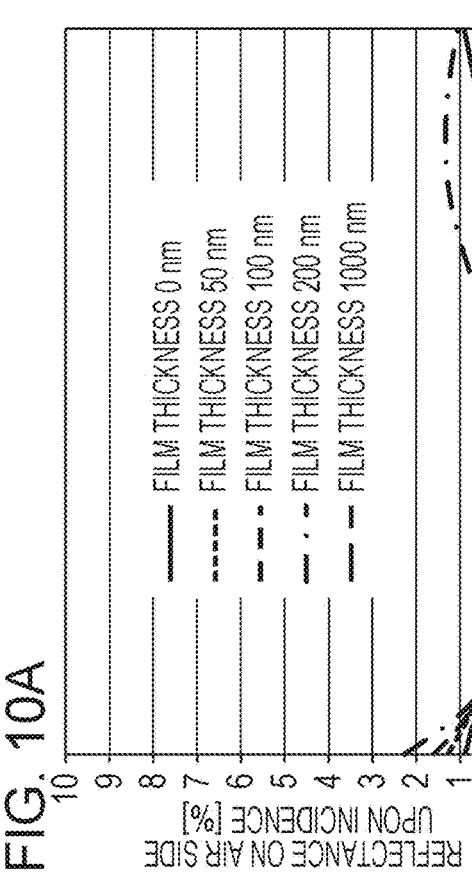

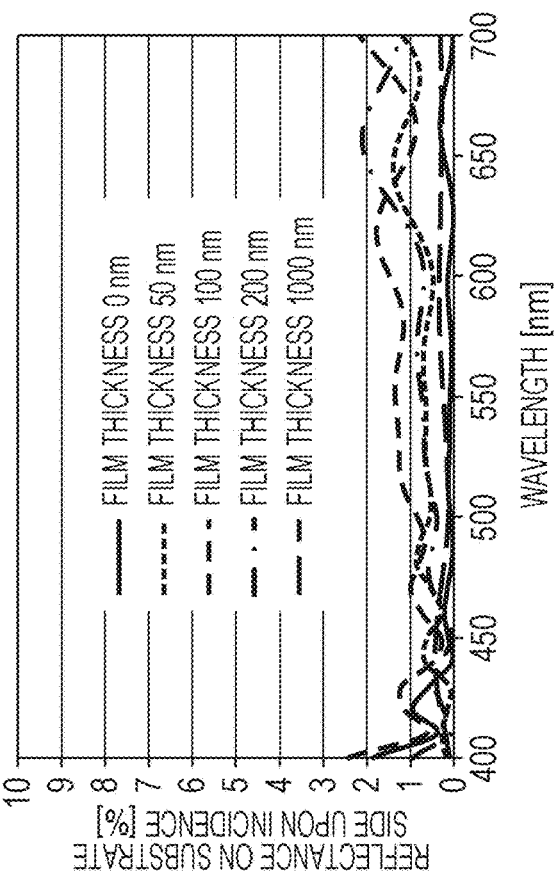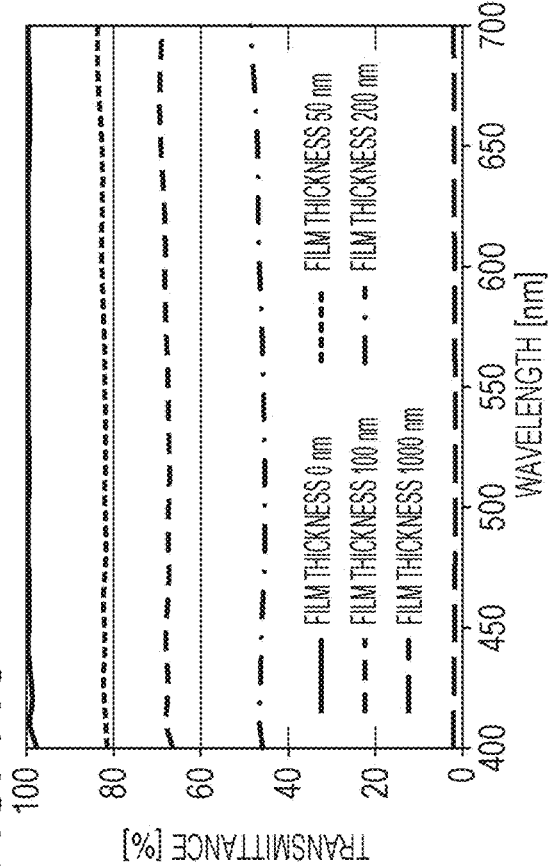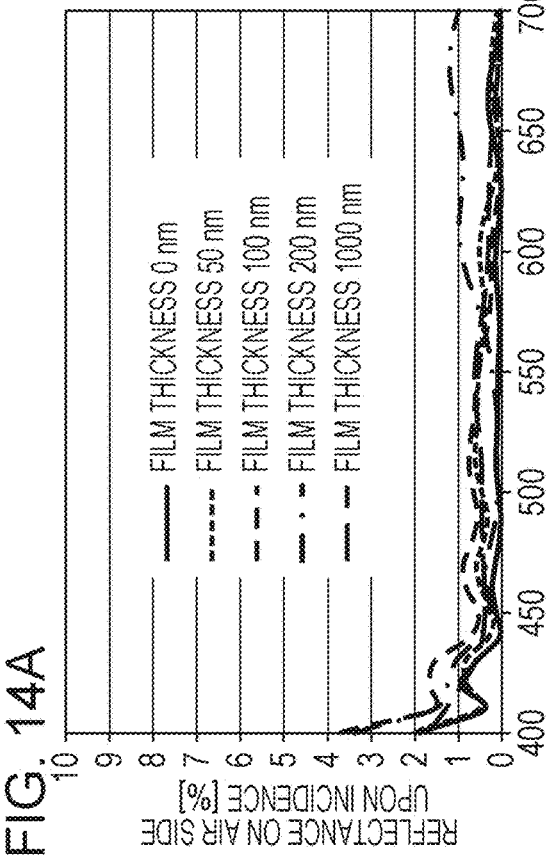

OPTICAL ELEMENT AND OPTICAL SYSTEM INCLUDING THE SAME

CROSS-REFERENCE TO RELATED APPLICATIONS

This application is a Continuation of International Patent Application No. PCT/JP2017/007636, filed Feb. 28, 2017, which claims the benefit of Japanese Patent Application No. 2016-041578, filed Mar. 3, 2016, both of which are hereby incorporated by reference herein in their entirety.

TECHNICAL FIELD

The present invention relates to an optical element for use in an optical system such as a digital camera.

BACKGROUND ART

A graduated ND (NeutralDensity) filter, transmittance of which has a distribution on an optical surface has been known as one of optical elements for use in optical systems such as digital cameras. The use of the graduated ND filter (referred to below as the GND filter) enables the brightness of an image to be selectively controlled and enables variation in acuteness of the contour of an image that is out of focus (blurred image) to be reduced.

A characteristic feature that the GND filter is required to have is that the degree of dependence of the transmittance on a wavelength is small.

PTL 1 discloses a GND filter in which absorption layers that are composed of different metals are formed on the front surface and the back surface of a substrate to reduce the dependence of the transmittance on the wavelength.

CITATION LIST

Patent Literature

PTL 1 Japanese Patent Laid-Open No. 2009-288294

In the GND filter that is disclosed in PTL 1, however, a metal film that has a large extinction coefficient is used as each absorption layer. Accordingly, variation in the thickness of the absorption layer results in transmittance distribution, and reflectance greatly varies at different locations of the GND filter. When the reflectance greatly varies, it is difficult to ensure a low reflectance over the entire GND filter, and there is a problem in that unnecessary light that causes a flare or a ghost is produced.

SUMMARY OF INVENTION

It is an object of the present invention to provide an optical element that enables variation in the reflectance and the dependence of the transmittance on the wavelength, which are caused due to variation in the transmittance of the absorption layer, to be reduced.

According to the present invention, an optical element includes a substrate, and an absorption layer, transmittance of which varies at different locations of the substrate. The absorption layer includes a first material an absorption coefficient of which, at a wavelength of 400 nm, is lower than an absorption coefficient at a wavelength of 700 nm, and a second material an absorption coefficient of which, at a wavelength of 400 nm, is larger than an absorption coefficient at a wavelength of 700 nm. An extinction coefficient of the absorption layer is equal to or less than 0.5 at a wavelength of 400 nm to 700 nm.

According to the present invention, another optical element includes a substrate, and an absorption layer, transmittance of which varies at different locations of the substrate. The absorption layer includes a first material and a second material. The first material is a titanium oxide an extinction coefficient of which, at a wavelength of 400 nm to 700 nm, is equal to or less than 0.5. The first material is a niobium oxide or a tantalum oxide an extinction coefficient of which, at a wavelength of 400 nm to 700 nm, is equal to or less than 0.5.

Further features of the present invention will become apparent from the following description of exemplary embodiments with reference to the attached drawings.

BRIEF DESCRIPTION OF DRAWINGS

FIGS. 10A to 10C illustrate the reflectance of the GND filter in the third example and the dependence of the transmittance thereof on the wavelength.

FIGS. 14A to 14C illustrate the reflectance of the GND filter in the fourth example and the dependence of the transmittance thereof on the wavelength.

DESCRIPTION OF EMBODIMENTS

Figure 1:
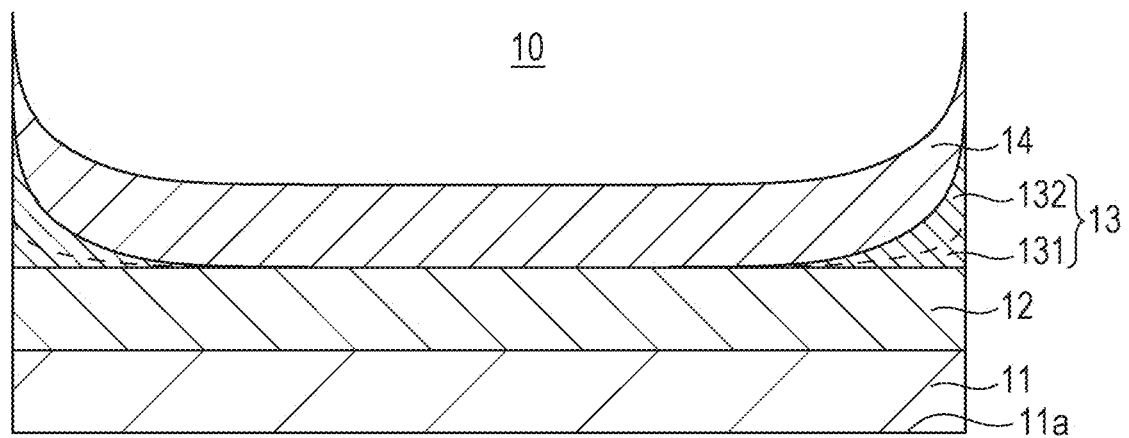
FIG. 1 schematically illustrates a GND filter in a first example.

Embodiments of the present invention will hereinafter be described with reference to the drawings. In the drawings, like components are designated by like reference numbers, and a duplicated description is omitted.

FIG. 1 schematically illustrates a GND filter 10 that corresponds to an optical element according to the present invention. The GND filter 10 according to the present embodiment includes a substrate 11 and an absorption layer 13 that absorbs a part of incident light.

According to the present embodiment, the absorption layer 13 includes a first film 131 that is composed of a first material and a second film 132 that is composed of a second material. The first material and the second material each have an extinction coefficient equal to or less than 0.5.

The thickness of the absorption layer 13 varies in a plane direction perpendicular to the normal line to a surface of the substrate 11. That is, the transmittance of the absorption layer 13 varies at different locations of the substrate.

As illustrated in FIG. 1, a surface layer 14 may be formed thereon. In this case, the absorption layer 13 is interposed between the substrate 11 and the surface layer 14.

As illustrated in FIG. 1, an intermediate layer 12 may be formed between the absorption layer 13 and the substrate 11. On a back surface 11a of the substrate 11, the same layers as these layers may be stacked, or an antireflection film may be formed (this is not illustrated).

Absorption Layer

Variation in the transmittance of an absorption layer of a GND filter typically causes variation in the dependence of the transmittance on the wavelength, and the dependence of the transmittance on the wavelength is difficult to reduce without being affected by the transmittance of the absorption layer. In addition, reflectance varies at regions of the absorption layer that have different transmittance values. Accordingly, the reflectance is difficult to reduce without being affected by the transmittance of the absorption layer. However, the GND filter 10 satisfies an expression (1) and an expression (3) described later, and this enables the variation in the dependence of the transmittance on the wavelength and the variation in the reflectance, which are caused due to the variation in the transmittance of the absorption layer, to be reduced.

The expression (1) will now be described. To reduce the variation in the dependence of the transmittance on the wavelength due to the variation in the transmittance of the absorption layer 13, the absorption coefficient $\alpha_1(\lambda)$ of the first material and the absorption coefficient $\alpha_2(\lambda)$ of the second material of the GND filter 10 according to the present embodiment satisfy the following conditional expression (1):

$$\alpha_1(400) < \alpha_1(700), \text{ and } \alpha_2(400) > \alpha_2(700). \tag{1}$$

The numerical values in parentheses in the expression (1) represent the wavelengths of light that has a unit of nanometers (nm). That is, the expression (1) indicates that the absorption coefficient of the first material at a wavelength of 400 nm is lower than the absorption coefficient at a wavelength of 700 nm, and that the absorption coefficient of the second material at a wavelength of 400 nm is larger than the absorption coefficient at a wavelength of 700 nm. An absorption coefficient $\alpha(\lambda)$ is given as: $\alpha(\lambda) = 4\pi k(\lambda)/\lambda$, where $k(\lambda)$ is the extinction coefficient dependent on the wavelength.

The following description contains the reason why the variation in the dependence of the transmittance on the wavelength due to the variation in the transmittance of the absorption layer 13 can be reduced when the expression (1) is satisfied.

Figure 15A:
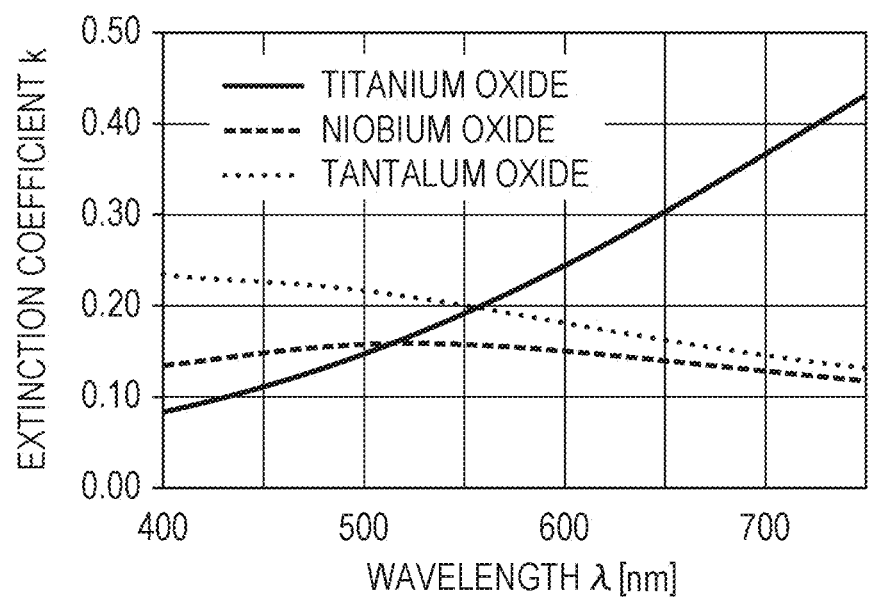
FIGS. 15A and 15B illustrate an example of the dependence of an extinction coefficient on the wavelength.
Figure 15B:
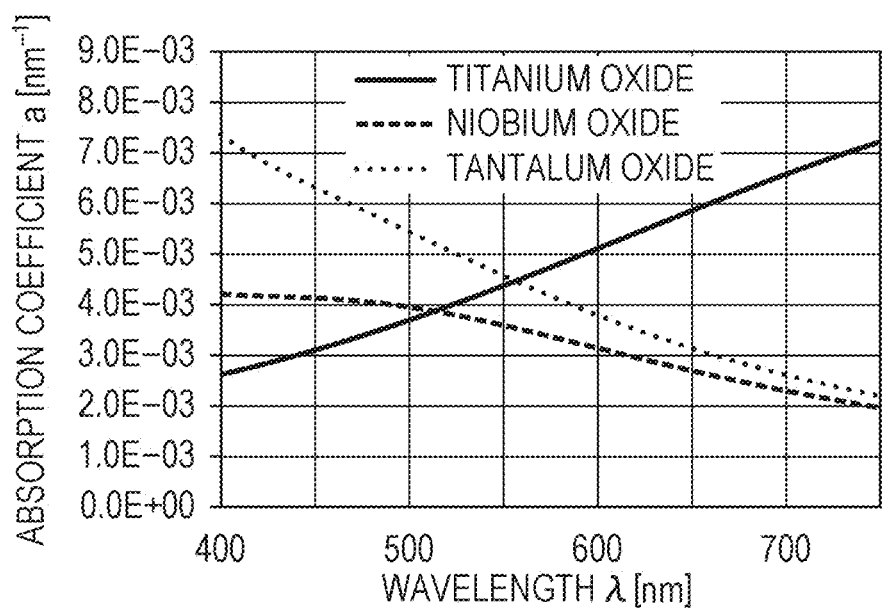
Figure 20:
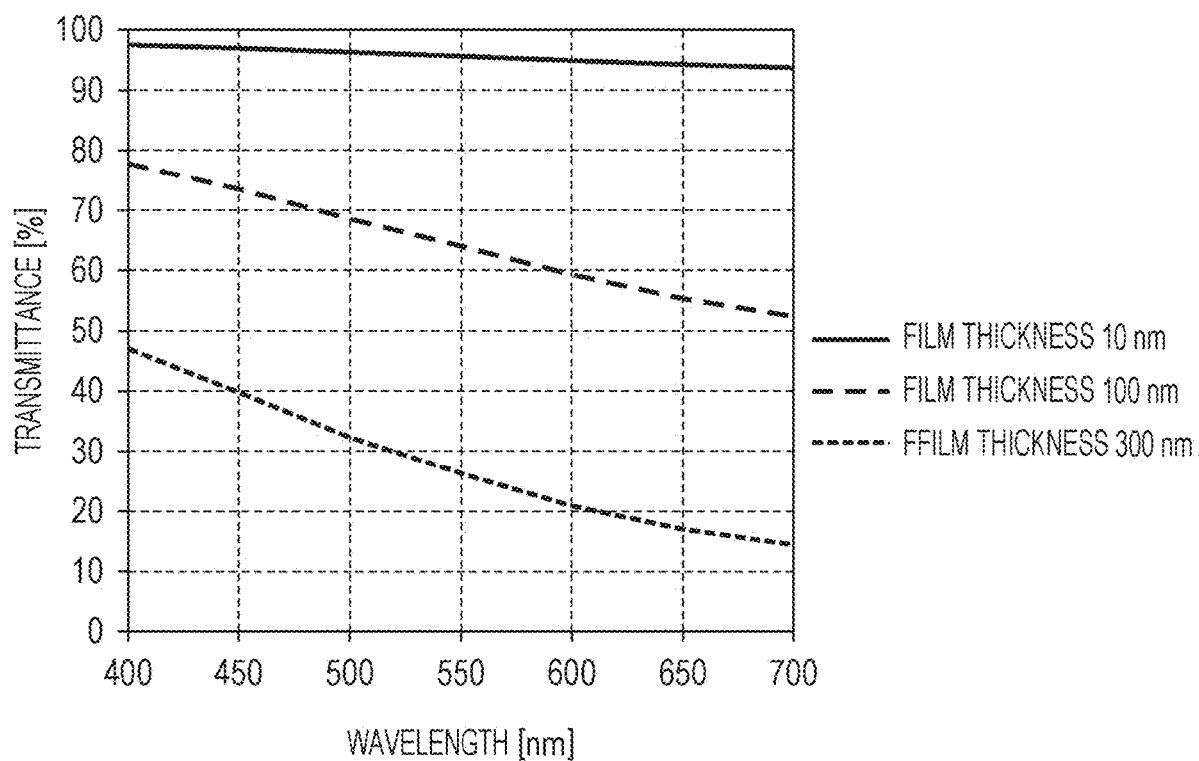
FIG. 20 illustrates the relationship between thickness and the transmittance.

The case where light is incident on a single thin film that is composed of a titanium oxide that has an absorption coefficient illustrated in FIG. 15B is considered as an example of the relationship between the dependence of the transmittance on the wavelength and the thickness. FIG. 20 illustrates the variation in the transmittance when the thickness of the single thin film that is composed of the titanium oxide is 10 nm, 100 nm, or 300 nm.

It can be understood from FIG. 20 that the more the thickness, the lower the transmittance. The reason is that the intensity I of light transmitted through an absorption film is given as the following expression (2):

$$I = I_0 \cdot \exp(-\alpha(\lambda) \cdot t), \tag{2}$$

where $I_0$ is the intensity of incident light, and t is the thickness of the film that has the absorption coefficient $\alpha(\lambda)$.

It can be also understood from FIG. 20 that the lower the transmittance, the more greatly the transmittance varies depending on the wavelength of the incident light. The dependence of the transmittance on the wavelength exponentially varies depending on the dependence of $\alpha(\lambda)$ on the wavelength as understood from the expression (2). This means that the variation in the thickness of the absorption layer 13 causes the dependence of the transmittance of the absorption layer 13 on the wavelength to vary depending on the dependence of the absorption coefficient of the material of the absorption layer 13 on the wavelength.

Accordingly, in the GND filter 10, the variation in the dependence of the transmittance on the wavelength due to the variation in the transmittance of the absorption layer 13 is reduced in a manner in which the dependence of $\alpha(\lambda)$ on the wavelength is reduced.

The first material, which satisfies the expression (1), absorbs a larger amount of light at a high wavelength than light at a low wavelength. The second material, which satisfies the expression (1), absorbs a larger amount of light at a low wavelength than light at a high wavelength. The first material and the second material have wavelength bands (referred to below as wavelength bands with different signs) in which, at wavelengths in at least a part of the range from a wavelength of 400 nm to a wavelength of 700 nm, the absorption coefficient of either the first material or the second material increases with respect to the wavelengths, and the absorption coefficient of the other decreases with respect to the wavelengths.

In the wavelength bands with different signs, the dependence of the absorption coefficient of the first material on the wavelength and the dependence of the absorption coefficient of the second material on the wavelength cancel out each other. Accordingly, the dependence of the absorption coefficient of the entire absorption layer 13 on the wavelength can be reduced, and the absorption coefficient can be constant.

It can be considered that there are wavelength bands (referred to below as wavelength bands with the same sign) in which both of the absorption coefficients increase or decrease in a wavelength of 400 nm to 700 nm even when the first material and the second material satisfy the expression (1).

However, the value of the absorption coefficient of the absorption layer 13 according to the present embodiment is the sum of the absorption coefficients of the first material and the second material in consideration for a ratio between the thicknesses of the first material and the second material of the absorption layer. For this reason, the dependence of the absorption coefficient of the absorption layer 13 on the wavelength in the wavelength bands with the same sign does not exceed a greater one of the dependence of the absorption coefficient of the first material and the dependence of the absorption coefficient of the second material on the wavelength in the wavelength bands.

Accordingly, when the expression (1) is satisfied, the dependence of the absorption coefficient of the absorption layer 13 on the wavelength can be reduced, and consequently, the variation in the dependence of the transmittance on the wavelength due to the variation in the transmittance of the absorption layer 13 can be reduced.

The expression (3) will now be described. At a wavelength of 400 nm to 700 nm, the extinction coefficient of the absorption layer 13 satisfies the following conditional expression:

$$0<k<0.5. \quad (3)$$

The absorption layer 13 absorbs at least a part of the incident light and has an extinction coefficient more than 0. The lower the extinction coefficient of the absorption layer 13, the less the reflectance varies due to the variation in the transmittance of the absorption layer 13. The range of k in the expression (3) has been found in view of this.

The following description contains a GND filter 10a that is obtained by simplifying the absorption layer of the GND filter 10 by way of example to describe, in detail, the reason why the lower the extinction coefficient of the absorption layer 13, the less the reflectance varies due to the variation in the transmittance of the absorption layer 13.

Figure 21:
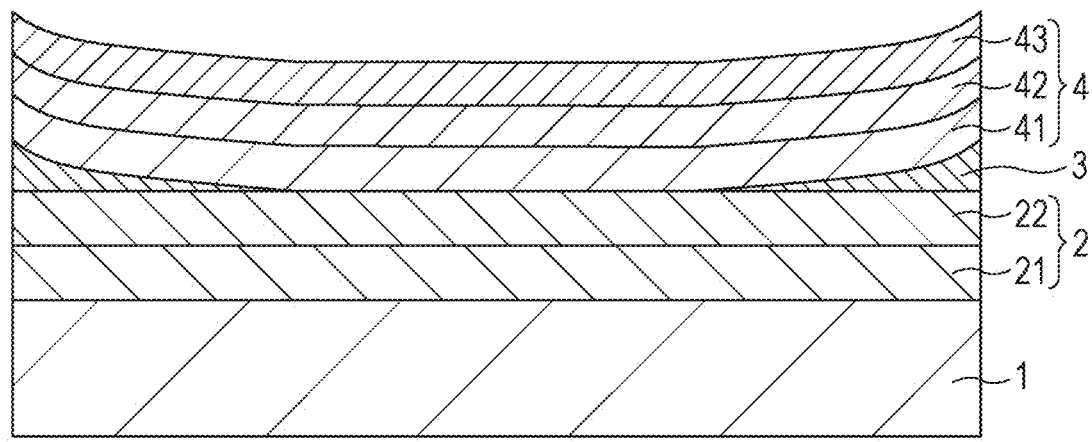
FIG. 21 schematically illustrates a GND filter into which the GND filter in FIG. 1 is simplified.

FIG. 21 schematically illustrates the GND filter 10a. The GND filter 10a includes an intermediate layer 2, an absorption layer 3, and a surface layer 4 that are formed in this order from a substrate 1. The intermediate layer 2 has two layers of films 21 and 22. The absorption layer 3 is formed of a film that has a certain extinction coefficient and that is composed of a single material. The thickness of the absorption layer 3 varies at different locations of the substrate 1. The surface layer 4 has three layers of films 41, 42, and 43. That is, the GND filter 10a differs from the GND filter 10 in that the absorption layer is composed of the single material. Strictly speaking, the GND filter 10a differs from the GND filter 10. However, the difference does not affect the main points of the following description.

FIGS. 22 and 23 illustrate trajectories of the admittance of the GND filter 10a.

The admittance is expressed as a ratio between the strength of a magnetic field and the strength of an electric field in a medium. The value of the refractive index of the medium is equal to the value of admittance with a unit of admittance $Y_0$ in a free space. In the following description, the admittance $\eta$ has a unit of $Y_0$. The illustration of the trajectories of the admittance represents film characteristics with a concept of equivalent admittance. The equivalent admittance represents admittance assuming that the entire system that includes a thin film on a substrate is replaced with a substrate that has equivalent characteristics.

The equivalent admittance and the illustration of the trajectories of the admittance are described in detail in a document "optical thin film and film formation technique", LEECHENG-CHUNG, translated by ULVAC, Inc.

Figure 22A:
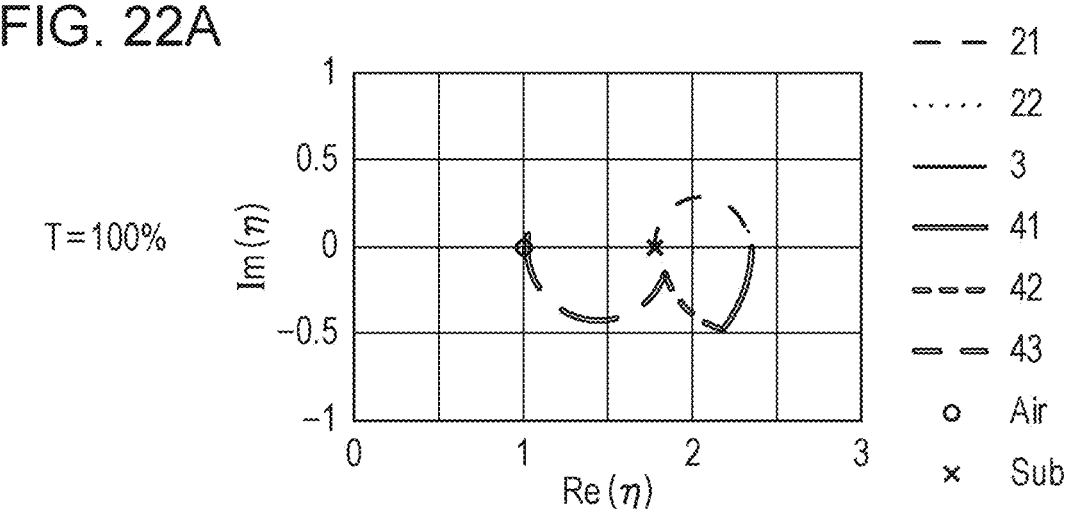
FIGS. 22A to 22C illustrate examples of the trajectory of admittance in the GND filter in FIG. 21.
Figure 22B:
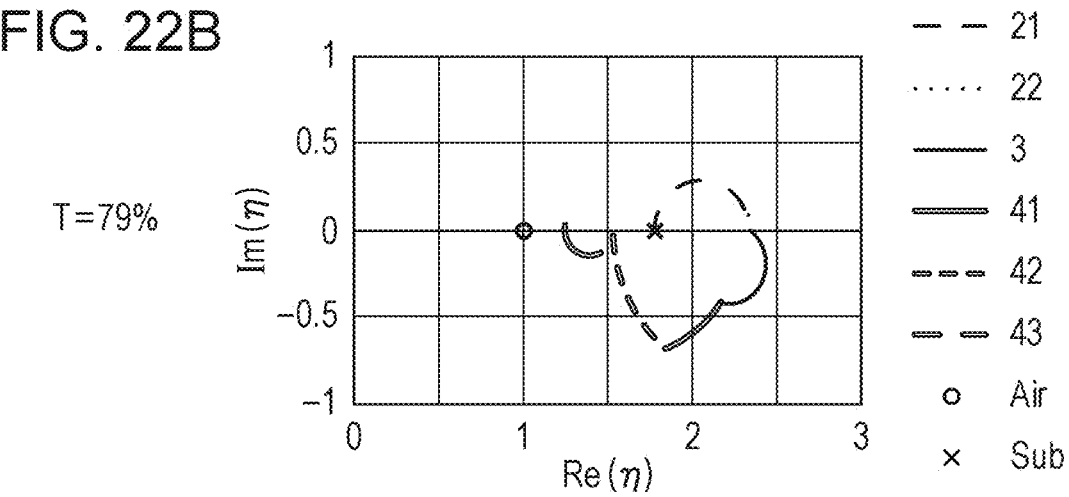
Figure 22C:
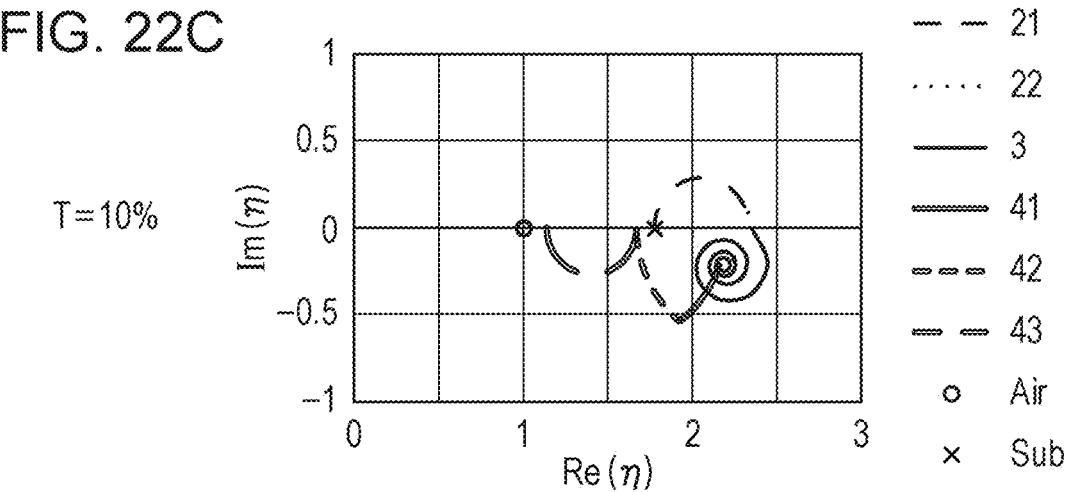

FIGS. 22A, 22B, and 22C illustrate the trajectories of the admittance of the GND filter 10a when the extinction coefficient of the absorption layer 3 is 0.218. FIGS. 22A, 22B, and 22C illustrate the trajectories of the admittance when light is incident from the air side on the GND filter 10a at positions at which the transmittance is 100%, 79%, and 10%. In the GND filter 10a, the transmittance decreases at a position at which the thickness of the absorption layer 3 increases. That is, FIG. 22A illustrates the trajectory of the admittance at a position at which the thickness of the absorption layer 3 is 0 (a position at which the absorption layer 3 is not formed). The thickness of the absorption layer 3 in FIG. 22B is more than that in FIG. 22C.

The illustration of the trajectory of the admittance in FIG. 22A is taken as an example to describe how to see the figures. In FIG. 22, the horizontal axis represents the real part Re ($\eta$) of the admittance $\eta$, and the vertical axis represents the imaginary part Im ($\eta$) of the admittance. The symbols "x" in the figures represent the admittance of the substrate 1, and the symbols "○" represent the admittance of air. The admittance of the substrate 1 is expressed as: $\eta_{sub}=N_{sub}$, where $N_{sub}$ is the refractive index of the substrate 1. When light is absorbed, the admittance at the time is equal to a complex refractive index N-ik. In this case, N is the refractive index, and k is the extinction coefficient.

The trajectory in FIG. 22A represents variation in the equivalent admittance in the case where the films 21, 22, 3, 41, 42, and 43 are formed in this order from the substrate 1. An end point of the trajectory when the film 43 (top layer) is formed represents the final equivalent admittance. Fresnel coefficient and the reflectance can be calculated by using the equivalent admittance and the admittance (=1) of air. When the equivalent admittance is equal to the admittance of air, the reflectance is 0.

FIG. 22A illustrates the case where the thickness of the absorption layer 3 is 0. When the thickness of the absorption layer 3 increases, and the transmittance decreases, the trajectory of the admittance varies as illustrated in FIGS. 22B and 22C. When the absorption layer 3 is sufficiently thick, and light is incident from the air side, the equivalent admittance from the substrate 1 to the absorption layer 3 is substantially equal to the complex refractive index of the absorption layer 3.

The case where the thickness of the absorption layer 3 is 0 as illustrated in FIG. 22A is compared with the case where the absorption layer 3 is sufficiently thick as illustrated in FIG. 22C. The equivalent admittance varies to the degree that corresponds to an extinction coefficient of k=0.218.

When the extinction coefficient of the absorption layer 3 is 0.218, and light is incident from the air side on the GND filter 10a, the equivalent admittance from the substrate 1 to the absorption layer 3 varies within the range illustrated in FIGS. 22A to 22C.

Figure 23A:
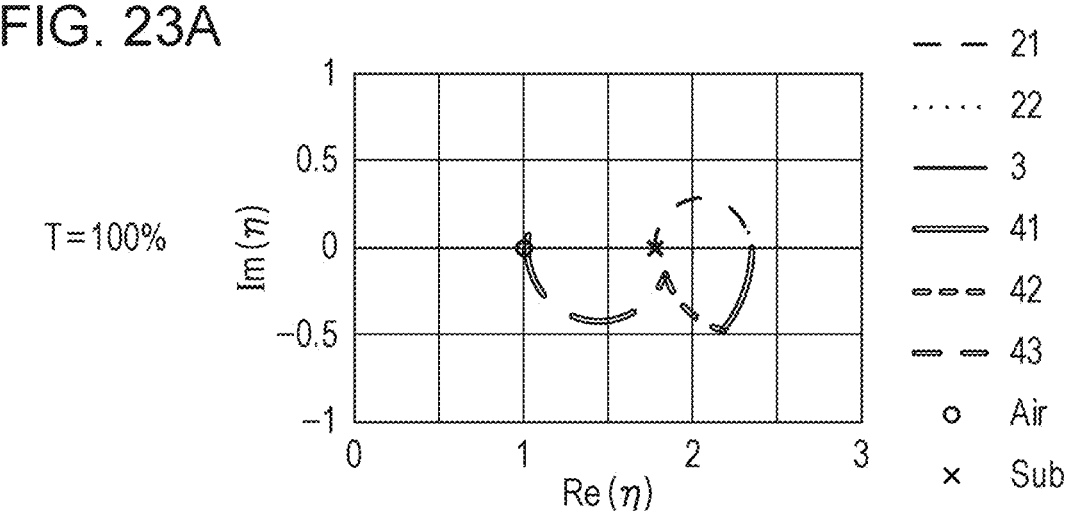
FIGS. 23A to 23C illustrate examples of the trajectory of admittance in the GND filter in FIG. 21.
Figure 23B:
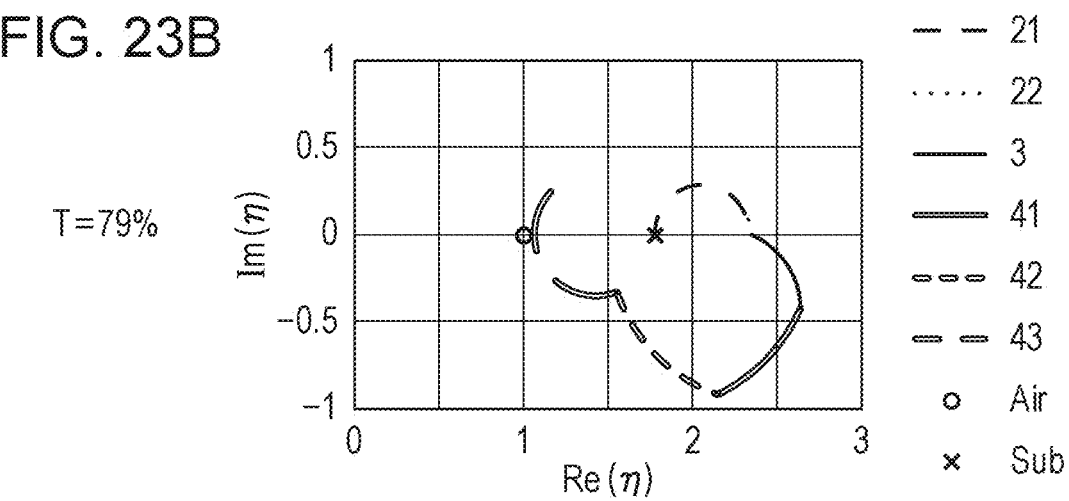
Figure 23C:
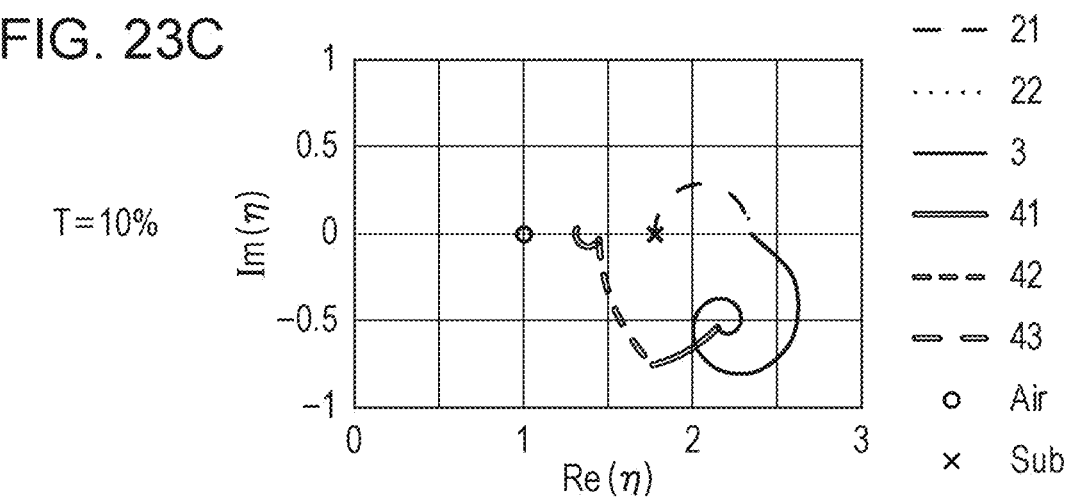

FIG. 23 illustrate the trajectories of the admittance of the GND filter 10a when the extinction coefficient of the absorption layer 3 is 0.5. FIGS. 23A, 23B, and 23C illustrate the trajectories of the admittance when light is incident from the air side on the GND filter 10a at positions at which the transmittance is 100%, 79%, and 10%. As illustrated in FIG. 23C, when the absorption layer 3 is sufficiently thick, the equivalent admittance from the substrate 1 to the absorption layer 3 is substantially equal to the complex refractive index of the absorption layer 3.

The case where the thickness of the absorption layer 3 is 0 as illustrated in FIG. 23A is compared with the case where the absorption layer 3 is sufficiently thick as illustrated in FIG. 23C. The equivalent admittance varies to the degree that corresponds to an extinction coefficient of k=0.5. The fact that the variations illustrated in FIG. 22 are smaller than those in FIG. 23 is revealed from the comparison of the variation in the equivalent admittance from the substrate 1 to the absorption layer 3 due to the variation in the thickness of the absorption layer 3 between FIG. 22 and FIG. 23. The reason is that the extinction coefficient of the absorption layer 3 in the case of FIG. 22 is lower than that in the case of FIG. 23.

When the variation in the equivalent admittance from the substrate 1 to the absorption layer 3 due to the variation in the thickness of the absorption layer 3 is small, the variation in the final equivalent admittance after the film 43 (top layer) is formed is also small. However, when the extinction coefficient of the absorption layer 3 is more than 0.5, the variation in the equivalent admittance is larger than that illustrated in FIG. 23. The fact that the variation in the equivalent admittance from the substrate 1 to the absorption layer 3 due to the variation in the thickness of the absorption layer 3 is small means that the variation in the reflectance due to the variation in the thickness of the absorption layer 3 is also small. For this reason, the lower the extinction coefficient of absorption layer 3, the further the variation in the reflectance due to the variation in the thickness of the absorption layer 3 can be reduced.

The same is true for the case where the absorption layer 13 includes the first material and the second material as in the GND filter 10. The variation in the reflectance due to the variation in the transmittance of the absorption layer 13 can be reduced in a manner in which the extinction coefficient of the absorption layer 13 is decreased. Accordingly, when the expression (3) is satisfied, the variation in the reflectance due to the variation in the transmittance of the absorption layer 13 of the GND filter 10 can be reduced.

According to the present embodiment, the absorption layer 13 includes the first film 131 that is composed of the first material and the second film 132 that is composed of the second material. In this case, the extinction coefficient of the absorption layer 13 varies along the interface between the first film 131 and the second film 132. When the first film 131 and the second film 132 satisfy the expression (3), the absorption layer 13 also satisfies the expression (3).

Specifically, the extinction coefficient of the absorption layer 13 according to the present embodiment is equal to the extinction coefficient of the first material at the first film 131 and is equal to the extinction coefficient of the second material at the second film 132. In this case, it is only necessary for the extinction coefficient of the first material and the extinction coefficient of the second material to be within the range of the expression (3).

Thus, the GND filter 10 satisfies the expressions (1) and (3). This enables the variation in the dependence of the transmittance on the wavelength and the variation in the reflectance, which are caused due to the variation in the transmittance of the absorption layer 13, to be reduced.

The larger the extinction coefficient of the absorption layer 13, the further the thickness of the absorption layer 13 can be decreased. This shortens the time of the formation of the absorption layer 13 by vapor deposition or spattering. The less the thickness of the absorption layer 13, the further the phase shift of the transmitted wavefront due to the absorption layer 13 can be reduced. For this reason, the range of the expression (3) is preferably the range of the following expression (3a):

$$0.005 \le k \le 0.5. \tag{3a}$$

More preferably, the range of the expression (3) is the range of the following expression (3b):

$$0.05 \le k \le 0.4. \tag{3b}$$

The absorption layer 13 of the GND filter 10 according to the present embodiment includes the first film 131 and the second film 132. The films that are included in the absorption layer 13 preferably satisfy the following conditional expression (4):

$$|\Delta N_{abs}| < 0.25. \tag{4}$$

$\Delta N_{abs}$ is the difference between the refractive indices of the adjoining films that are included in the absorption layer 13 with respect to light at a wavelength of 550 nm. When the expression (4) is satisfied, the difference between the refractive indices at the interface between the films that are included in the absorption layer 13 is decreased, and the variation in the reflectance can be further reduced.

The films that are included in the absorption layer 13 preferably satisfy the following expression conditional expression (5):

$$|\Delta k_{abs}| < 0.2. \tag{5}$$

$\Delta k_{abs}$ is the difference between the extinction coefficients of the adjoining films that are included in the absorption layer 13 with respect to light at a wavelength of 550 nm. When the expression (5) is satisfied, the difference between the extinction coefficients at the interface between the films that are included in the absorption layer 13 is decreased, and the variation in the reflectance can be further reduced.

To further reduce the variation in the dependence of the transmittance on the wavelength due to the variation in the thickness of the absorption layer 13, the thicknesses of the first film 131 and the second film 132 are preferably adjusted in accordance with the dependence of the absorption coefficient $\alpha_1$ ($\lambda$) of the first material and the absorption coefficient $\alpha_2$ ($\lambda$) of the second material on the wavelength. For this reason, the GND filter 10 satisfies the following conditional expression:

$$-1.5 \le (a_1/a_2) \cdot (t_1/t_2) \le -0.7, \tag{6}$$

where $t_1$ is the thickness of the first film 131 and $t_2$ is the thickness of the second film 132 at a position at which the thickness of the absorption layer 13 is the maximum.

$a_1$ is the coefficient of $\lambda$ when a linear approximation of the absorption coefficient $\alpha_1$ ($\lambda$) of the first material with respect to the wavelength $\lambda$ is obtained by the least-squares method in the wavelength bands with different signs. $a_2$ is the coefficient of $\lambda$ when a linear approximation of the absorption coefficient $\alpha_2$ ($\lambda$) of the second material with respect to the wavelength $\lambda$ is obtained by the least-squares method in the wavelength bands with different signs. That is, $a_1$ is the slope of an approximate straight line of $\alpha_1$ ($\lambda$) in the wavelength bands with different signs, and $a_2$ is the slope of an approximate straight line of $\alpha_2$ ($\lambda$) in the wavelength bands with different signs.

When the first film 131 and the second film 132 satisfy the expression (6), the dependence of the absorption coefficient of the first material and the dependence of the absorption coefficient of the second material on the wavelength more effectively cancel out each other in the wavelength bands with different signs. Consequently, the variation in the dependence of the transmittance on the wavelength due to the variation in the thickness of the absorption layer 13 can be further reduced. The range of the expression (6) is more preferably as follows:

$$-1.1 \le (a_1/a_2) \cdot (t_1/t_2) \le -0.9. \tag{6a}$$

The variation in the dependence of the transmittance on the wavelength due to the variation in the thickness of the absorption layer 13 can be further reduced in a manner in which a ratio between the thicknesses of the first film 131 and the second film 132 is determined to be constant regardless of the thickness of the absorption layer 13.

When the first film 131 and the second film 132 are formed at the above ratio between the thicknesses, the first material and the second material preferably satisfy the following conditional expression:

$$-10 < a_1/a_2 < -0.1. \tag{7}$$

When the expression (7) is satisfied, the ratio between the thicknesses of the first film 131 and the second film 132 is prevented from being extremely large, and the thicknesses can be readily adjusted when the first film 131 and the second film 132 are formed by, for example, vapor deposition.

Specific materials that can be used as the first material and the second material will now be described. FIG. 15A illustrates the dependence of the extinction coefficients of a titanium oxide, a niobium oxide, and a tantalum oxide on the wavelength. FIG. 15B illustrates the dependence of the absorption coefficients thereof on the wavelength.

It can be understood from FIG. 15B that, when a titanium oxide is selected as the first material, and a niobium oxide or a tantalum oxide is selected as the second material, the expression (1) is satisfied.

In this case, the entire wavelength band from a wavelength of 400 nm to a wavelength of 700 nm corresponds to the wavelength bands with different signs. It can be understood from FIG. 15A that the extinction coefficients of a titanium oxide, a niobium oxide, and a tantalum oxide are equal to or less than 0.5 at a wavelength of 400 to 700 nm. That is, the extinction coefficient of the absorption layer that is composed of these materials satisfies the expression (3). However, the first material and the second material are not limited thereto, provided that materials that satisfy the expression (1) are appropriately selected, and the extinction coefficient of the absorption layer 13 satisfies the expression (3).

When a titanium oxide is used as the first material, the first film 131 is preferably located nearest to the substrate 11 in the absorption layer 13. A state of oxidation of a titanium oxide is likely to change at a high temperature, in high humidity, or upon ultraviolet radiation. However, in the case where the first film 131 is composed of a titanium oxide and located nearest to the substrate 11 in the absorption layer 13, the titanium oxide film can be protected by another film, and the state of oxidation of the titanium oxide can be inhibited from varying.

When the first material is a titanium oxide, the following condition, instead of the expression (7), is preferably satisfied to inhibit the transmittance and the reflectance from varying due to the variation in the state of oxidation.

$$-10 < a_1/a_2 \le -1 \tag{7a}$$

When the expression (7a) is satisfied, the thickness of the first film 131 can be less than the thickness of the second film 132. This inhibits the reflectance and the transmittance from varying due to the variation in the state of oxidation of the titanium oxide.

In an example described according to the present embodiment, the absorption layer 13 has a structure of two layers of the first film 131 and the second film 132. The present invention, however, is not limited thereto. It is only necessary for the absorption layer 13 to include the first material and the second material that satisfy the expressions (1) and (3). For example, the absorption layer 13 may include another film. The films that are included in the absorption layer 13 are preferably satisfy the expressions (4) and (5). The variation in the dependence of the transmittance on the wavelength due to the variation in the thickness of the absorption layer 13 can be further reduced in a manner in which a ratio between the thicknesses of the films is determined in accordance with the dependence of the absorption coefficient of the films that are included in the absorption layer 13 on the wavelength.

Surface Layer and Intermediate Layer

The surface layer 14 and the intermediate layer 12 will now be described.

In general, an optical element that includes an absorption layer such as a GND filter exhibits different reflectance values between the case where light is incident from the air side and the case where light is incident from the substrate side. The reason is that the Fresnel coefficients at interfaces in the optical element that includes the absorption layer are different from each other depending on the direction in which light is incident. To reduce the reflectance both in the case where light is incident from the air side and the case where light is incident from the substrate side, the GND filter 10 includes the intermediate layer 12 and the surface layer 14.

The surface layer 14 has a main function of reducing the reflectance between the absorption layer 13 and air. The surface layer 14 includes a thin film or thin films. An increase in the number of the thin films that are included in the surface layer 14 enables the refractive index to be adjusted, enables an antireflection band to be increased, enables dependence on an incident angle to be reduced, and enables dependence on polarization to be reduced. The surface layer 14 is not limited to a uniform multilayer film, may include a layer that contains hollow fine particles, and may include a structure that has fine irregularities on a surface thereof.

The intermediate layer 12 has a main function of reducing the reflectance between the substrate 11 and the absorption layer 13. The intermediate layer 12 includes a thin film or thin films. An increase in the number of the thin films that are included in the intermediate layer 12 enables the refractive index to be adjusted, enables the antireflection band to be increased, enables the dependence on the incident angle to be reduced, and enables the dependence on the polarization to be reduced.

Since the GND filter 10 satisfies the expression (3), the variation in the reflectance due to the variation in the transmittance of the absorption layer 13 is reduced. Consequently, when light is incident from the air side, the reflectance can be reduced regardless of the transmittance of the absorption layer 13 even with a simple structure that includes the surface layer 14 that has a uniform thickness. Similarly, when light is incident from the substrate side, the reflectance can be reduced regardless of the transmittance of the absorption layer 13 even with a simple structure that includes the intermediate layer 12 that has a uniform thickness.

The surface layer 14 preferably includes a film that has a refractive index $N_{14}$ that satisfies the following conditional expression (8):

$$1 < N_{14} < N_{abs,sur}. \tag{8}$$

$N_{abs,sur}$ is the refractive index of the film nearest to the surface layer 14 among the films that are included in the absorption layer 13. When the expression (8) is satisfied, the variation in the equivalent admittance from air to the absorption layer 13 when light is incident from the substrate side can be further reduced. Consequently, the variation in the reflectance due to the variation in the thickness of the absorption layer 13 can be further reduced.

The intermediate layer 12 preferably includes a film that has a refractive index $N_{12}$ that satisfies the following conditional expression (9) or (9a):

$$N_{sub} < N_{12} < N_{abs,int} (N_{sub} < N_{abs,int}), \quad (9)$$

$$N_{sub} > N_{12} > N_{abs,int} (N_{sub} > N_{abs,int}). \quad (9a)$$

$N_{abs,int}$ is the refractive index of the film nearest to the intermediate layer 12 among the films that are included in the absorption layer 13. $N_{sub}$ is the refractive index of the substrate 11. That is, the fact that the expression (9) or (9a) is satisfied means the intermediate layer 12 includes the film the refractive index of which is between the $N_{abs,int}$ and $N_{sub}$. When the expression (9) or (9a) is satisfied, the variation in the equivalent admittance from the substrate 11 to the absorption layer 13 when light is incident from the air side can be further reduced. Consequently, the variation in the reflectance due to the variation in the transmittance of the absorption layer 13 can be further reduced.

The reflectance of the GND filter 10 at a position at which the transmittance of the absorption layer 13 is the minimum is preferably equal to or less than 4% with respect to a wavelength of 400 nm to 700 nm both upon air-side incidence and upon substrate-side incidence. The substrate-side incidence means that light is incident from the substrate toward the absorption layer. The air-side incidence means that light is incident from the absorption layer toward the substrate. This enables the occurrence of a flare or a ghost due to light reflected from the GND filter 10 to be sufficiently decreased when the GND filter 10 is used for an optical system.

Phase Shift of Transmitted Wavefront Due to Thickness Distribution of Absorption Layer The thickness of the absorption layer 13 of the GND filter 10 according to the present embodiment varies at different locations of the substrate. For this reason, it can be considered that a phase shift of a transmitted wavefront of light that passes through the absorption layer 13 occurs depending on the thickness of the absorption layer 13. To compensate the phase shift of the transmitted wavefront, phase compensation layers 32 and 43 that have thickness distribution may be formed as with a GND filter 30 illustrated in FIG. 7 and a GND filter 40 illustrated in FIG. 11.

Figure 8:
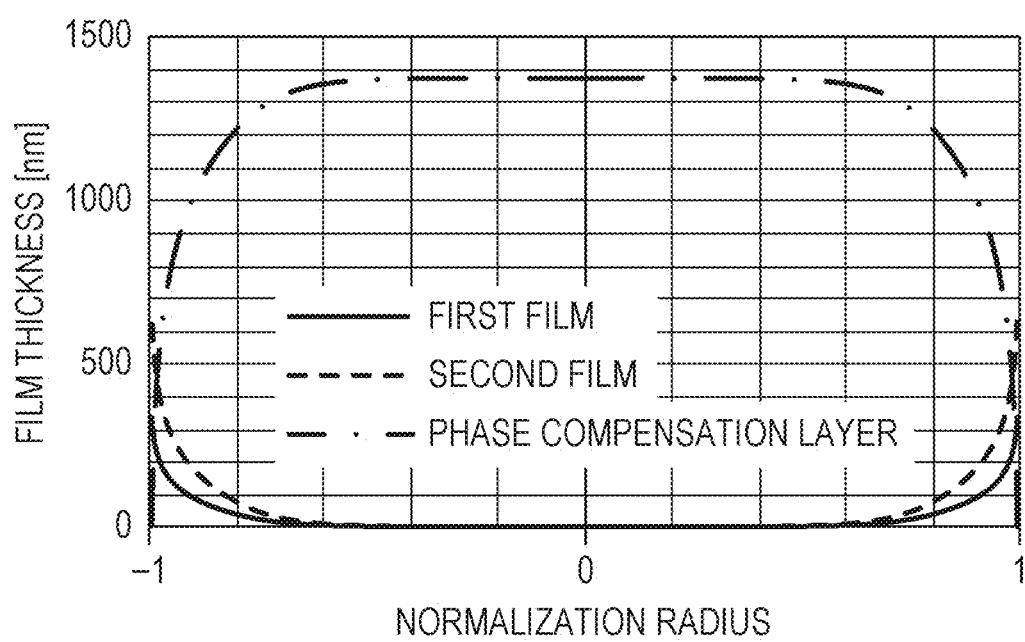
FIG. 8 illustrates the thickness distribution of an absorption layer and a phase compensation layer of the GND filter in the third example.

FIG. 8 illustrates thickness distribution of an absorption layer 34 and the phase compensation layer 32 of the GND filter 30, which includes the phase compensation layer 32. The vertical axis represents the thicknesses, and the horizontal axis represents an in-plane position that is normalized by the radius of the GND filter 30. As illustrated in FIG. 8, the thickness of the absorption layer 34 increases from the center of the GND filter 30 to the circumference, whereas the thickness of the phase compensation layer 32 decreases from the center to the circumference. That is, the thickness of the phase compensation layer 32 increases in the direction opposite the direction in which the thickness of the absorption layer 34 increases.

To correct the phase shift of the transmitted wavefront successfully, the thickness of the phase compensation layer 32 preferably varies so as to satisfy the following condition:

$$|\Delta OPD/\lambda| \le 0.30. \quad (10)$$

λ is the wavelength of light, ΔOPD is the difference between an optical path length at a position at which the thickness of the absorption layer 34 is the minimum and an optical path length at a position at which the thickness of the absorption layer 34 is more than that at the position. That is, ΔOPD is the difference between the optical path lengths with the position at which the thickness of the absorption layer 34 is the minimum being a reference position. In the GND filter 30, ΔOPD corresponds to the difference between an optical path length at a position (a central portion of the GND filter 30) that is represented by a normalization radius of 0 and an optical path length at another position. The optical path length described herein corresponds to an amount that is defined by the sum of the products of the refractive indices and the thicknesses of the layers that are stacked on a substrate 31.

Figure 9:
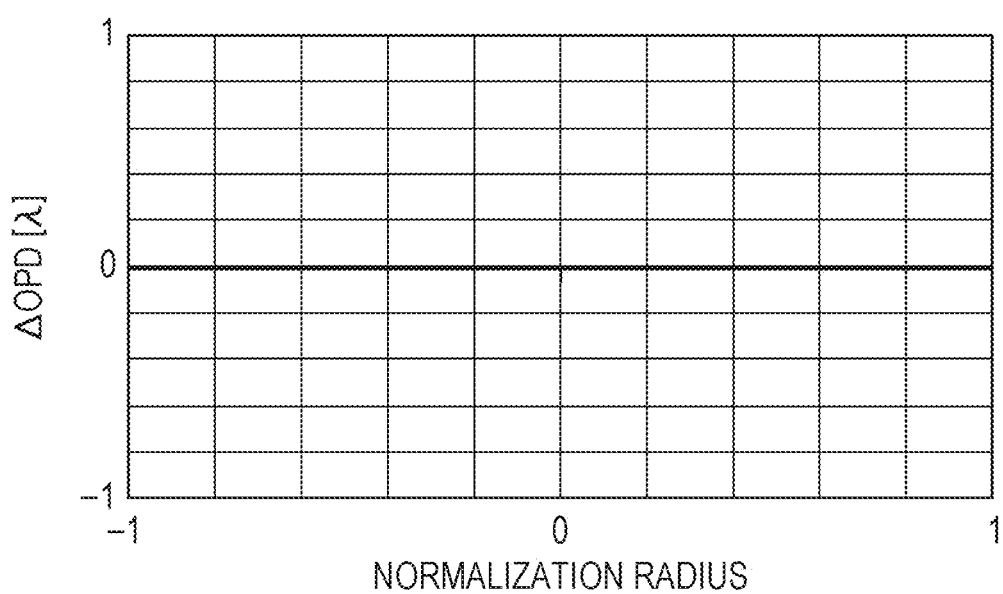
FIG. 9 illustrates a phase shift of a transmitted wavefront of the GND filter in the third example.

When the expression (10) is satisfied, as illustrated in FIG. 9, ΔOPD due to thickness distribution of the absorption layer 32 can be compensated.

The complex refractive index of the absorption layer and the complex refractive index of the phase compensation layer differ from each other, and accordingly, it is difficult to equalize the admittance of the phase compensation layer with the admittance of the absorption layer regardless of the thickness of the absorption layer. Consequently, the reflectance varies also due to variation in the thickness of the phase compensation layer.

In the case where the phase compensation layer is located nearer than the absorption layer to the substrate, the variation in the reflectance due to the variation in the thicknesses of the phase compensation layer and the absorption layer when light is incident from the substrate side tends to be larger than when light is incident from the air side. In the case where the absorption layer is located nearer than the phase compensation layer to the substrate, the variation in the reflectance due to the variation in the thicknesses of the phase compensation layer and the absorption layer when light is incident from the air side tends to be larger than when light is incident from the substrate side.

The tendency of the variation in the reflectance due to the variation in the thicknesses of the absorption layer and the phase compensation layer differs depending on the position of the phase compensation layer and the direction in which light is incident. In general, when light is incident from the substrate side, the reflectance can be more readily reduced than when light is incident from the air side. Accordingly, the phase compensation layer is preferably disposed between the substrate and the absorption layer in order to reduce the reflectance when light is incident from the air side and the reflectance when light is incident from the substrate side in a balanced manner.

In the case where the phase compensation layer 32 is adjacent to the substrate 31 as with the GND filter 30, the following conditional expression is preferably satisfied.

$$|N_{sub} - N_{cmp}| < 0.10 \quad (11)$$

$N_{sub}$ is the refractive index of the substrate 31 with respect to light at a wavelength of 550 nm. $N_{cmp}$ is the refractive index of the phase compensation layer 32 with respect to light at a wavelength of 550 nm.

When the expression (11) is satisfied, the reflectance at the interface between the substrate 31 and the phase compensation layer 32 can be reduced. Consequently, the variation in the reflectance due to the variation in the thickness of the phase compensation layer can be reduced. The range of the expression (11) is more preferably as follows:

$$|N_{sub} - N_{cmp}| < 0.05. \quad (11a)$$

Figure 11:
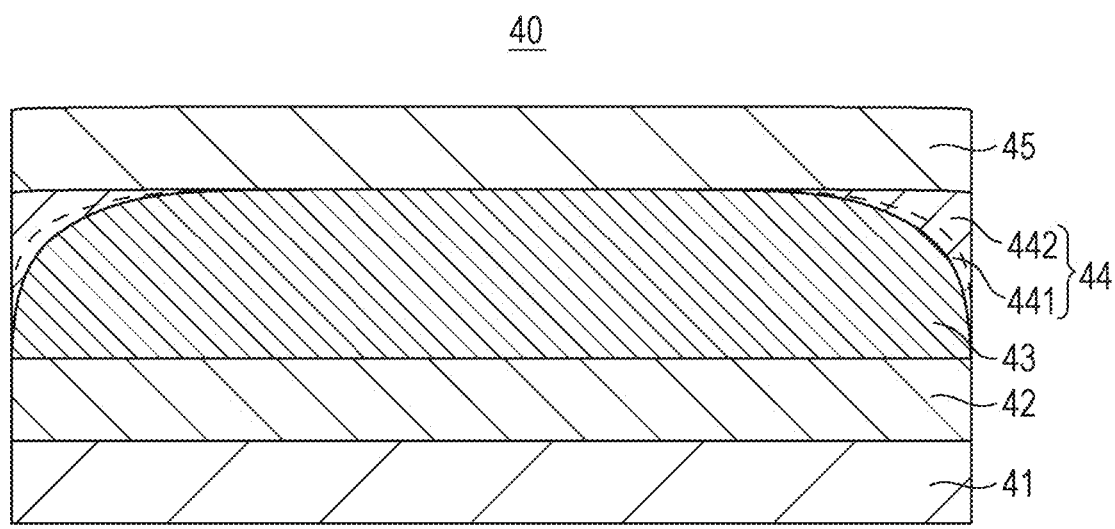
FIG. 11 schematically illustrates a GND filter in a fourth example.

As illustrated in FIG. 11, in the case where the phase compensation layer 43 is adjacent to an absorption layer 44, the following conditional expression is preferably satisfied.

$$|N_{abs,c} - N_{cmp}| < 0.15 \quad (12)$$

$N_{abs,c}$ is the refractive index of the film adjacent to the phase compensation layer 43 among the films that are included in the absorption layer 44 with respect to light at a wavelength of 550 nm. When the expression (12) is satisfied, the reflectance at the interface between the phase compensation layer 43 and the absorption layer 44 can be reduced. Consequently, the variation in the reflectance due to the variation in the thickness of the phase compensation layer 43 can be reduced. The range of the expression (12) is more preferably as follows:

$$|N_{abs,c} - N_{cmp}| < 0.10. \quad (12a)$$

Manufacturing Method

A method of manufacturing the GND filter 10 according to the present embodiment will now be described.

An example of a method of forming the absorption layer 13 is vapor deposition. For example, a thin film that is composed of a titanium oxide that has characteristics illustrated in FIG. 15 can be formed in a manner in which $Ti_3O_5$ is vapor-deposited at an appropriate partial pressure of oxygen. A thin film that is composed of a niobium oxide that has characteristics illustrated in FIG. 15 can be obtained in a manner in which $Nb_2O_5$ is vapor-deposited under a vacuum. A film that is composed of a tantalum oxide that has characteristics illustrated in FIG. 15 can be obtained in a manner in which $Ta_2O_5$ is vapor-deposited under a vacuum.

The thickness distribution can be achieved in a manner in which a temperature gradient is produced in the substrate 11 during vapor deposition or a mask is inserted between a target and the substrate 11.

The method of forming the absorption layer 13 is not limited to vapor deposition and may be appropriately selected in accordance with the characteristics of the first material and the second material. Other examples of the method of forming the absorption layer 13 include spattering, plating, and spin coating.

The substrate 11 can be composed of, for example, glass or plastic. The shape of the substrate 11 is not limited to a flat plate shape and may be a shape of a convex lens or a concave lens. In the case where the GND filter 10 is disposed in an optical system of an imaging apparatus such as a digital camera, the substrate 11 that has a lens shape enables a space in which the GND filter is disposed to be decreased, and, for example, the size of the optical system of the imaging apparatus can be decreased.

Transmittance Distribution of GND Filter

Figure 16A:
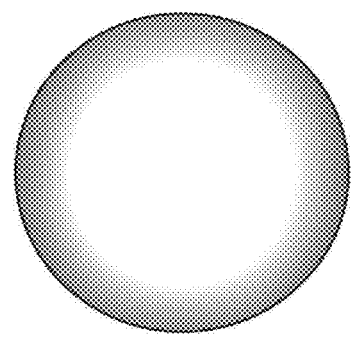
FIGS. 16A to 16D illustrate examples of transmittance distribution.
Figure 16B:
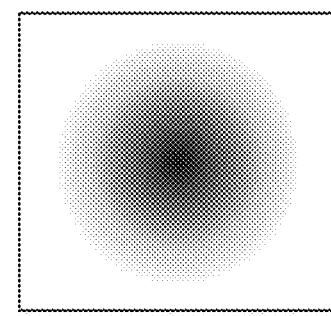
Figure 16C:
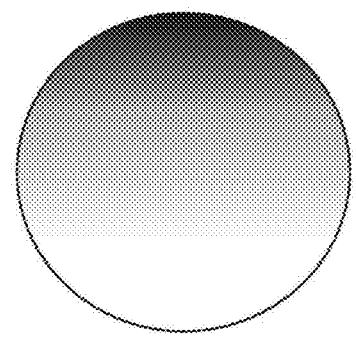
Figure 16D:
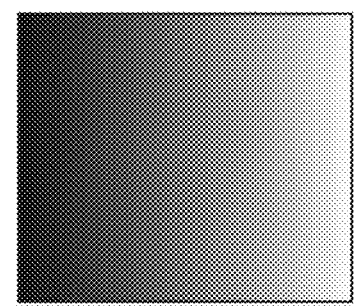

The GND filter 10 according to the present embodiment has transmittance distribution that corresponds to thickness distribution of the absorption layer 13. The GND filter 10 may have various patterns of transmittance distribution. For example, as illustrated in FIGS. 16A and 16B, the GND filter 10 may have a concentric transmittance distribution, or as illustrated in FIGS. 16C and 16D, the transmittance may vary in one direction. Other than these patterns, there are various patterns of transmittance distribution for use. The present embodiment can be used for any patterns of transmittance distribution.

The GND filters according to the present embodiment will be described in examples below.

First Example

The GND filter 10 that corresponds to an optical element in a first example is illustrated in FIG. 1 and includes the intermediate layer 12, the absorption layer 13, and the surface layer 14 that are arranged in this order from the substrate 11. The absorption layer 13 includes the first film 131 and the second film 132.

Table 1 illustrates the detail of the films that are included in the GND filter 10. In Table 1, n is a refractive index with respect to light at a wavelength of 550 nm, k is an extinction coefficient with respect to light at a wavelength of 550 nm, and d is the thickness of each thin film. The same is true for examples described later.

In the GND filter 10, the intermediate layer 12 has four layers of thin films, and the surface layer 14 has five layers of thin films.

The first film 131 is composed of a titanium oxide. The second film 132 is composed of a niobium oxide. In the present example, the extinction coefficients of the titanium oxide and the niobium oxide are illustrated in FIG. 15A. It can be understood that, when the extinction coefficient of the absorption layer 13 that is composed of the titanium oxide and the niobium oxide illustrated in FIG. 15A satisfies the expression (3). It can be understood from FIG. 15B that the combination of the titanium oxide and the niobium oxide results in the expression (1) being satisfied. A ratio between the thicknesses of the first film 131 and the second film 132 is 1:2 regardless of the thickness of the absorption layer 13.

Figure 2:
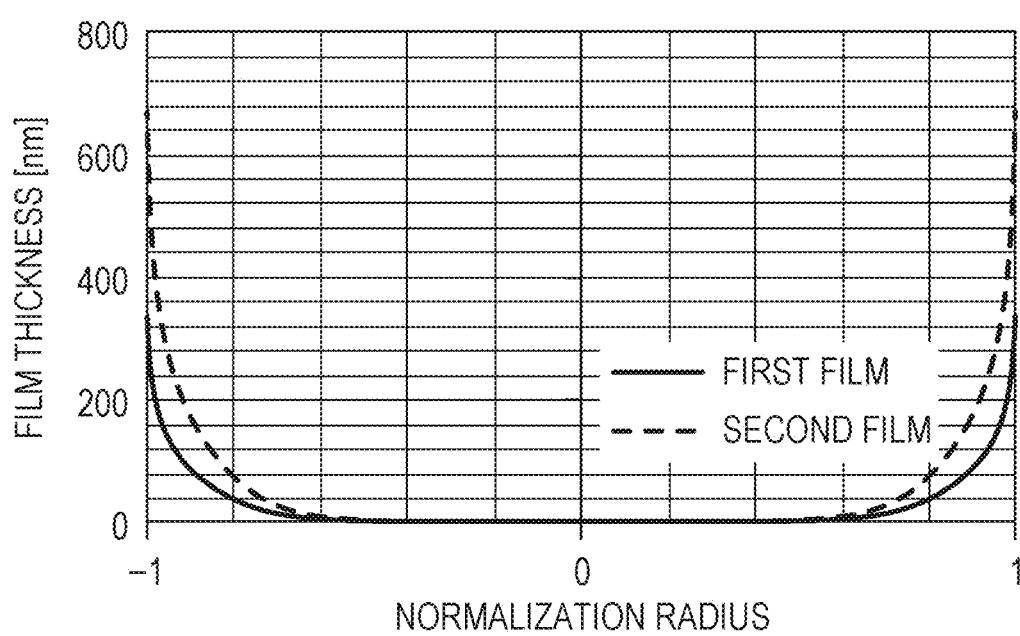
FIG. 2 illustrates the thickness distribution of an absorption layer of the GND filter in the first example.

FIG. 2 illustrates thickness distribution of the first film 131 and the second film 132 that are included in the absorption layer 13. At the position at which the thickness of the absorption layer 13 is the maximum, the thickness of the first film 131 is 333 nm, and the thickness of the second film 132 is 666 nm.

Figure 3A:
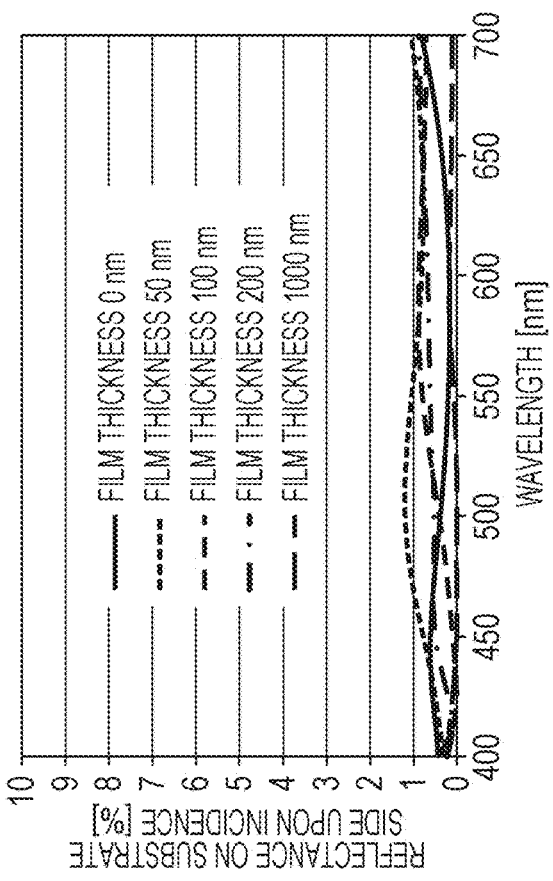
FIGS. 3A to 3C illustrate the reflectance of the GND filter in the first example and the dependence of the transmittance thereof on a wavelength.
Figure 3B:
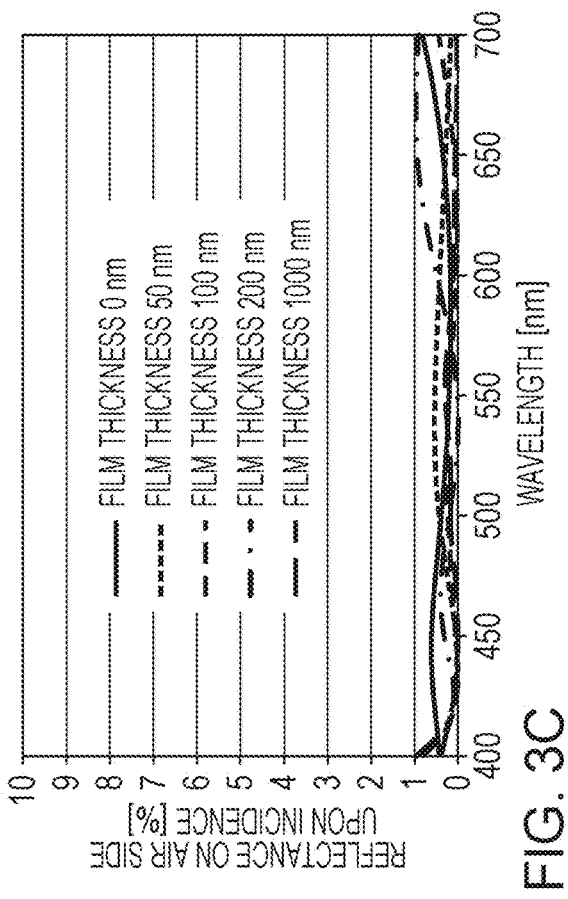
Figure 3C:
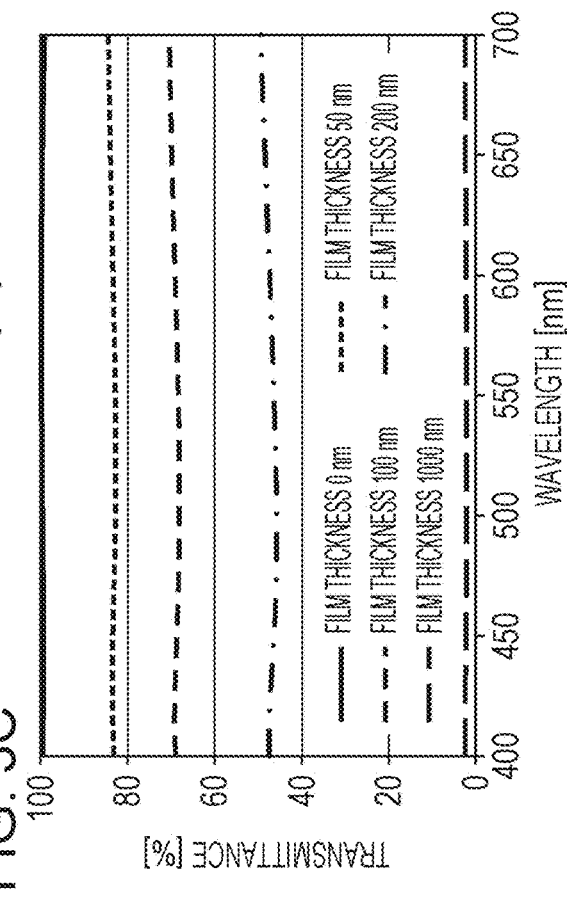

FIG. 3 illustrate the reflectance of the GND filter 10 and the dependence of the transmittance thereof on the wavelength. FIG. 3A illustrates the reflectance when light is incident from the air side. FIG. 3B illustrates the reflectance when light is incident from the substrate side. FIG. 3C illustrates the transmittance. In FIGS. 3A, 3B, and 3C, the case where the thickness of the absorption layer 13 is 0 nm is illustrated by a solid line, the case where the thickness is 50 nm is illustrated by a dotted line, the case where the thickness is 100 nm is illustrated by a dashed line, the case where the thickness is 200 nm is illustrated by a one-dot chain line, and the case where the thickness is 1000 nm is illustrated by a long dashed line.

In FIGS. 3A and 3B, the reflectance of the GND filter 10 is equal to or less than 4% both upon the air-side incidence and upon the substrate-side incidence. In particular, the reflectance is equal to or less than 2% at or near 550 nm at which a luminosity function is large regardless of the transmittance of the absorption layer 23. It can be understood that the variation in the reflectance due to the variation in the transmittance of the absorption layer 13 is small. In FIG. 3C, the variation in the dependence of the transmittance on the wavelength due to the variation in the transmittance of the absorption layer 13 is small, and the transmittance is constant.

TABLE 1

Table 1

| FILM NUMBER | n | d [nm] | k | REMARK |
|---|---|---|---|---|
| — | 1.00000 | — | 0 | AIR |
| 11 | 1.24971 | 106.5 | 0 | SURFACE |
| 10 | 2.21365 | 6.2 | 0 | LAYER 14 |
| 9 | 1.65958 | 37.4 | 0 | |

TABLE 1-continued

Table 1

| FILM NUMBER | n | d [nm] | k | REMARK |
|---|---|---|---|---|
| 8 | 2.21365 | 14.6 | 0 | |
| 7 | 1.65958 | 12.9 | 0 | |
| 6 | 2.34189 | FILM THICKNESS DISTRIBUTION | 0.1575 | ABSORPTION LAYER 13 |
| 5 | 2.12214 | FILM THICKNESS DISTRIBUTION | 0.1917 | |
| 4 | 2.21365 | 16.8 | 0 | INTERMEDIATE LAYER 12 |
| 3 | 1.65958 | 15.9 | 0 | |
| 2 | 2.21365 | 17.3 | 0 | |
| 1 | 1.65958 | 78.1 | 0 | |
| — | 1.49830 | — | 0 | SUBSTRATE 11 |

Second Example

Figure 4:
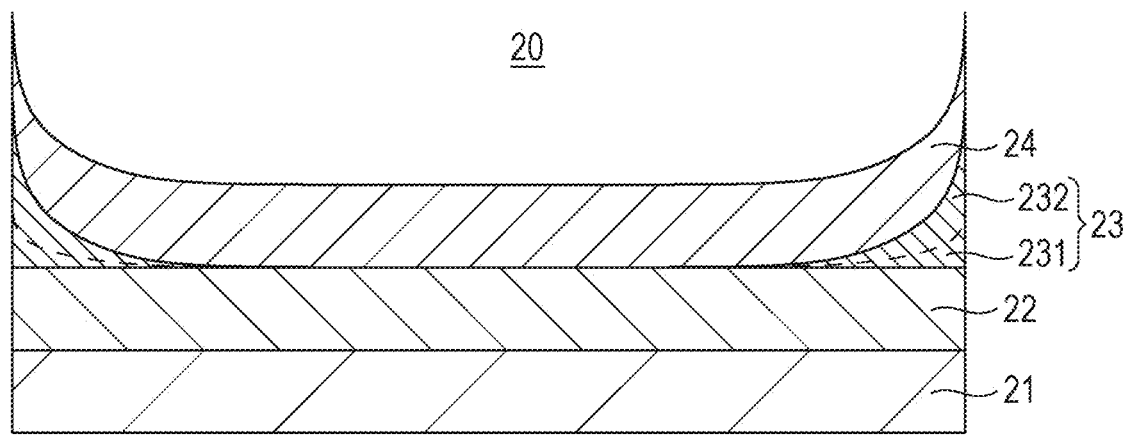
FIG. 4 schematically illustrates a GND filter in a second example.

A GND filter 20 that corresponds to an optical element in a second example is schematically illustrated in FIG. 4. Table 2 illustrates the detail of the films that are included in the GND filter 20. The GND filter 20 includes an intermediate layer 22, an absorption layer 23, and a surface layer 24 that are arranged in this order from a substrate 21 as in the GND filter 10 in the first example 1.

The absorption layer 23 of the GND filter 20 in the second example includes a first film 231 that is composed of a titanium oxide and a second film 232 that is composed of a tantalum oxide. That is, the GND filter 20 differs from the GND filter 10 in that the second film 232 is composed of the tantalum oxide.

In the present example, the extinction coefficient of the tantalum oxide is illustrated in FIG. 15A. It can be understood that, when the extinction coefficient of the absorption layer 23 that is composed of the tantalum oxide and the titanium oxide illustrated in FIG. 15A satisfies the expression (3). It can be understood from FIG. 15B that the combination of the titanium oxide and the tantalum oxide results in the expression (1) being satisfied. A ratio between the thicknesses of the first film 231 and the second film 232 of the GND filter 20 is 1:1 regardless of the thickness of the absorption layer 13.

In the GND filter 20, the intermediate layer 22 has four layers, and the surface layer 24 has three layers.

Figure 5:
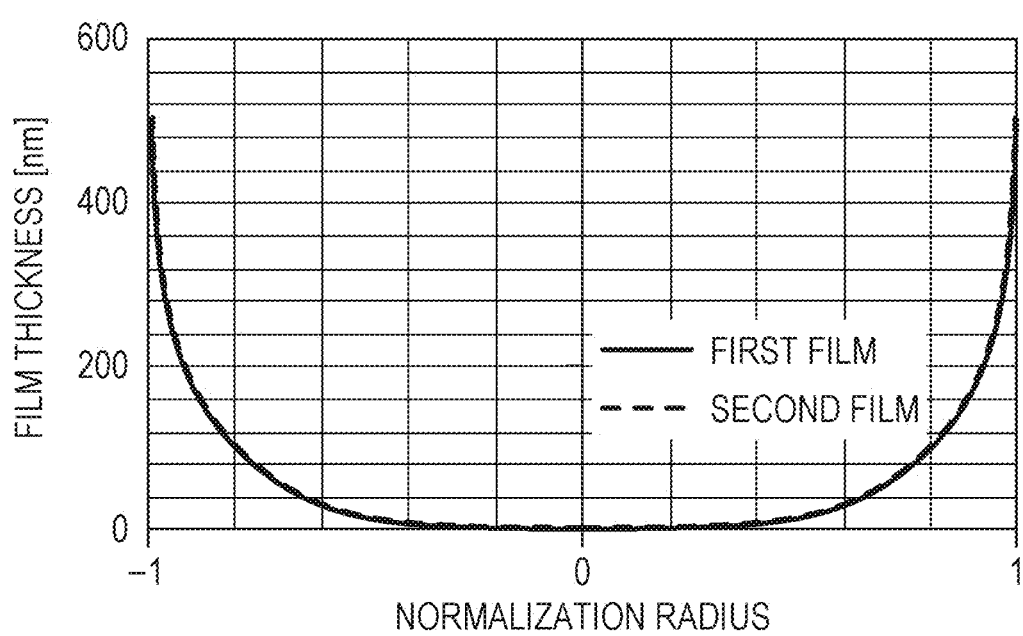
FIG. 5 illustrates the thickness distribution of an absorption layer of the GND filter in the second example.

FIG. 5 illustrates thickness distribution of the first film 231 and the second film 232 that are included in the absorption layer 23. At the position at which the thickness of the absorption layer 23 is the maximum, the thickness of the first film 231 is 500 nm, and the thickness of the second film 232 is 500 nm.

Figure 6B:
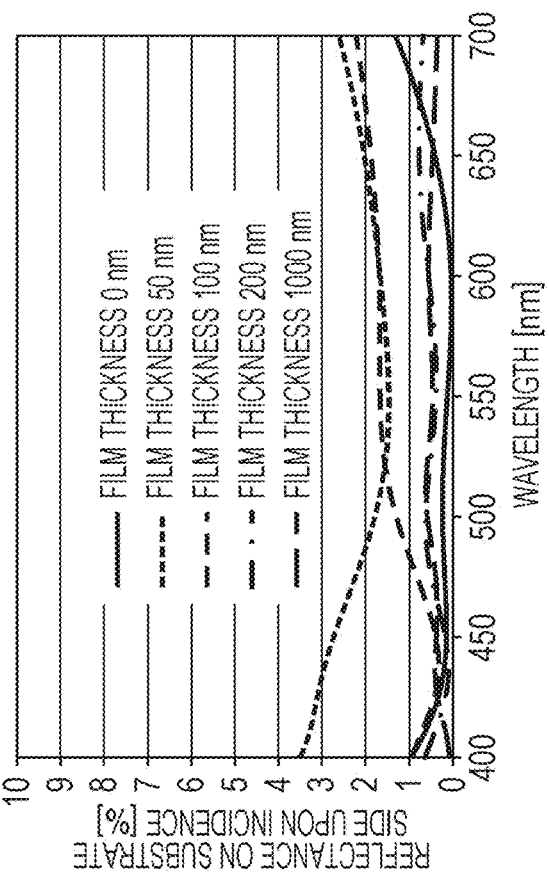
FIGS. 6A to 6C illustrate the reflectance of the GND filter in the second example and the dependence of the transmittance thereof on the wavelength.
Figure 6A:
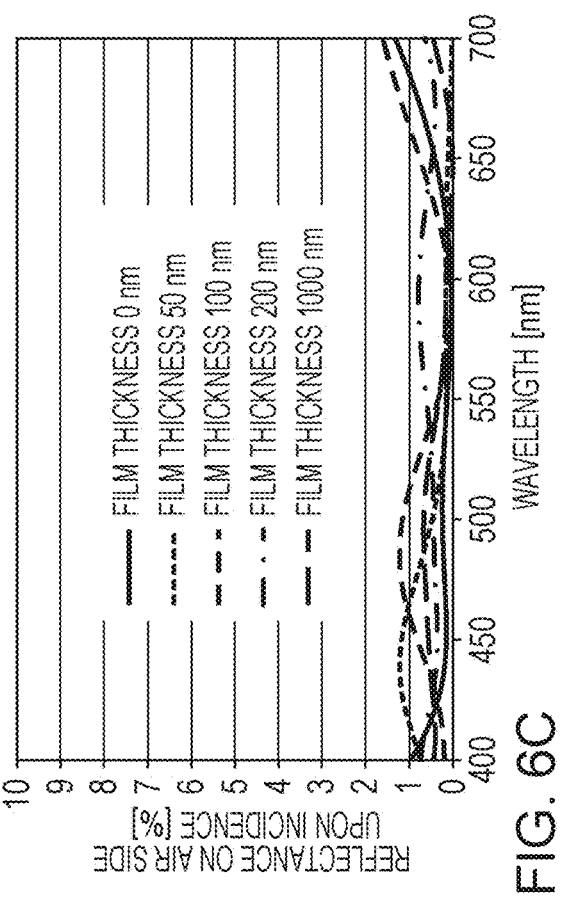
Figure 6C:
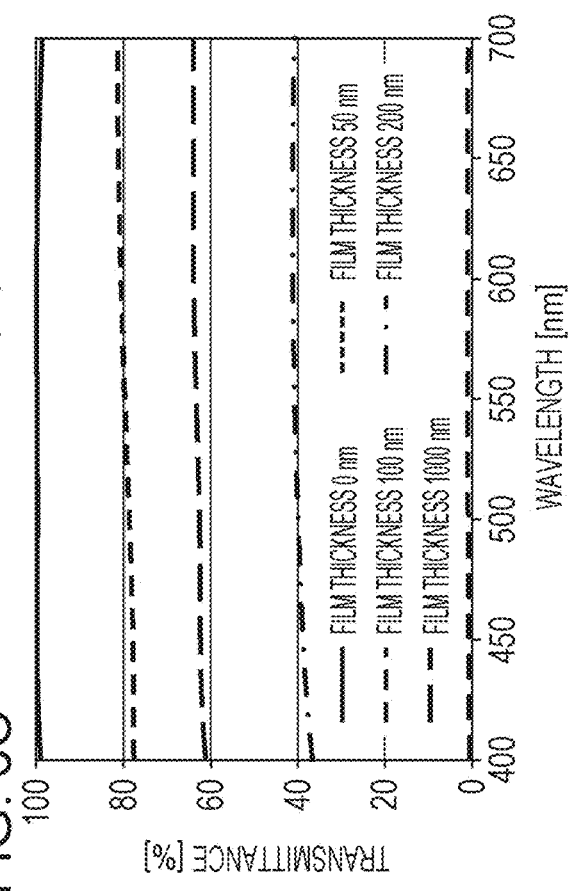

FIG. 6 illustrate the reflectance of the GND filter 10 and the dependence of the transmittance thereof on the wavelength. FIG. 6A illustrates the reflectance when light is incident from the air side. FIG. 6B illustrates the reflectance when light is incident from the substrate side. FIG. 6C illustrates the transmittance. In FIGS. 6A, 6B, and 6C, the case where the thickness of the absorption layer 23 is 0 nm is illustrated by a solid line, the case where the thickness is 50 nm is illustrated by a dotted line, the case where the thickness is 100 nm is illustrated by a dashed line, the case where the thickness is 200 nm is illustrated by a one-dot chain line, and the case where the thickness is 1000 nm is illustrated by a long dashed line.

In FIGS. 6A and 6B, the reflectance of the GND filter 20 is equal to or less than 4% both upon the air-side incidence and upon the substrate-side incidence. In particular, the reflectance is equal to or less than 2% at or near 550 nm at which the luminosity function is large regardless of the transmittance of the absorption layer 23. It can be understood that the variation in the reflectance due to the variation in the transmittance of the absorption layer 23 is small. In FIG. 6C, the variation in the dependence of the transmittance on the wavelength due to the variation in the transmittance of the absorption layer 23 is small, and the transmittance is constant.

TABLE 2

Table 2

| FILM NUMBER | n | d [nm] | k | REMARK |
|---|---|---|---|---|
| — | 1.00000 | — | 0 | AIR |
| 9 | 1.38763 | 96.7 | 0 | SURFACE LAYER 24 |
| 8 | 2.21365 | 21.4 | 0 | |
| 7 | 1.65958 | 15 | 0 | |
| 6 | 2.32468 | FILM THICKNESS DISTRIBUTION | 0.2005 | ABSORPTION LAYER 23 |
| 5 | 2.12214 | FILM THICKNESS DISTRIBUTION | 0.1917 | |
| 4 | 1.65958 | 17.9 | 0 | INTERMEDIATE LAYER 22 |
| 3 | 2.21365 | 22.5 | 0 | |
| 2 | 1.65958 | 51.4 | 0 | |
| 1 | 2.21365 | 6.2 | 0 | |
| — | 1.49830 | — | 0 | SUBSTRATE 21 |

Third Example

Figure 7:
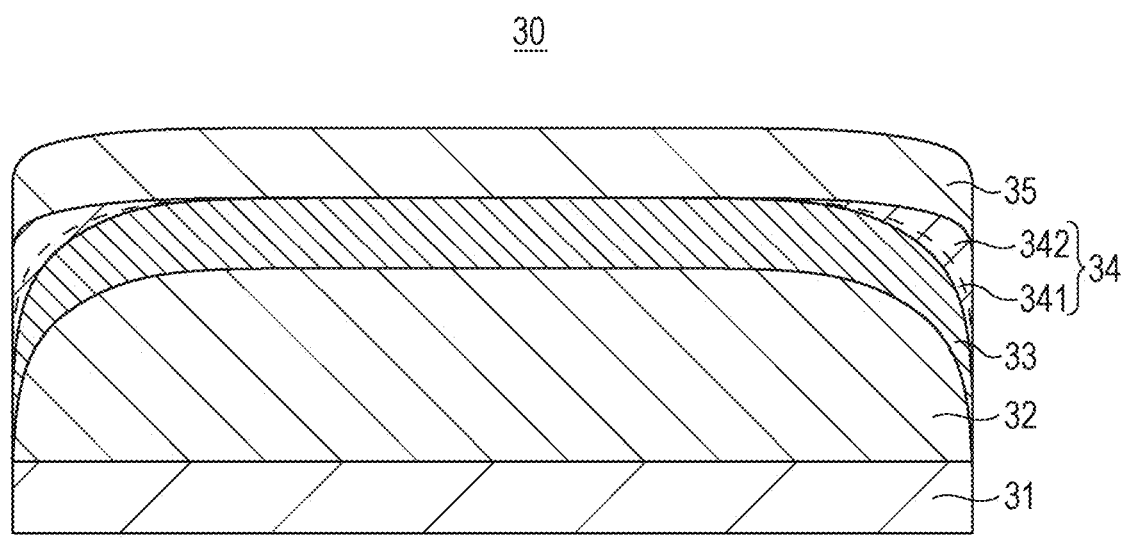
FIG. 7 schematically illustrates a GND filter in a third example.

The GND filter 30 that corresponds to an optical element in a third example is schematically illustrated in FIG. 7. Table 3 illustrates the detail of the films that are included in the GND filter 30. The GND filter 30 includes the phase compensation layer 32, an intermediate layer 33, the absorption layer 34, and a surface layer 35 that are arranged in this order from the substrate 31. The GND filter 30 in the present example differs from the GND filter 10 in the first example in including the phase compensation layer 32. The structure of the absorption layer 34 is the same as with the GND filter 10 in the first example. The absorption layer 34 of the GND filter 30 in the present example includes a first film 341 that is composed of a titanium oxide and a second film 342 that is composed of a niobium oxide.

FIG. 8 illustrates thickness distribution of the absorption layer 34 and the phase compensation layer 32 of the GND filter 30 in the present example. FIG. 9 illustrates a phase shift of a transmitted wavefront. The thickness distribution of the phase compensation layer 32 is designed as illustrated in FIG. 8, and, as illustrated in FIG. 9, this enables the phase shift of the transmitted wavefront due to the thickness distribution of the absorption layer 34 to be compensated.

FIG. 10 illustrate the reflectance of the GND filter 30 and the dependence of the transmittance thereof on the wavelength. FIG. 10A illustrates the reflectance when light is incident from the air side. FIG. 10B illustrates the reflectance when light is incident from the substrate side. FIG. 10C illustrates the transmittance. In FIGS. 10A, 10B, and 10C, the case where the thickness of the absorption layer 34 is 0 nm is illustrated by a solid line, the case where the thickness is 50 nm is illustrated by a dotted line, the case where the thickness is 100 nm is illustrated by a dashed line, the case where the thickness is 200 nm is illustrated by a one-dot chain line, and the case where the thickness is 1000 nm is illustrated by a long dashed line.

In FIGS. 10A and 10B, the reflectance of the GND filter 30 is equal to or less than 4% both upon the air-side incidence and upon the substrate-side incidence. In particular, the reflectance is equal to or less than 2% at or near 550 nm at which the luminosity function is large regardless of the transmittance of the absorption layer 34. It can be understood that the variation in the reflectance due to the variation in the transmittance of the absorption layer 34 is small. In FIG. 10C, the variation in the dependence of the transmittance on the wavelength due to the variation in the transmittance of the absorption layer 34 is small, and the transmittance is constant.

TABLE 3

Table 3

| FILM NUMBER | n | d [nm] | k | REMARK |
|---|---|---|---|---|
| — | 1.00000 | — | 0 | AIR |
| 12 | 1.24971 | 110.5 | 0 | SURFACE |
| 11 | 2.21365 | 12.1 | 0 | LAYER 35 |
| 10 | 1.65958 | 37.9 | 0 | |
| 9 | 2.21365 | 23.3 | 0 | |
| 8 | 1.65958 | 6.4 | 0 | |
| 7 | 2.34189 | FILM THICKNESS DISTRIBUTION | 0.1575 | ABSORPTION LAYER 34 |
| 6 | 2.12214 | FILM THICKNESS DISTRIBUTION | 0.1917 | |
| 5 | 1.65958 | 8.7 | 0 | INTERMEDIATE |
| 4 | 2.21365 | 25.8 | 0 | LAYER 33 |
| 3 | 1.65958 | 36.4 | 0 | |
| 2 | 2.21365 | 9.2 | 0 | |
| 1 | 1.65958 | FILM THICKNESS DISTRIBUTION | 0 | PHASE COMPENSATION LAYER 32 |
| — | 1.65397 | — | 0 | SUBSTRATE 31 |

Fourth Example

The GND filter 40 that corresponds to an optical element in a fourth example is schematically illustrated in FIG. 11. Table 4 illustrates the detail of the films that are included in the GND filter 40. The GND filter 40 includes an intermediate layer 42, the phase compensation layer 43, the absorption layer 44, and a surface layer 45 that are arranged in this order from a substrate 41. The GND filter 30 in the present example differs from the GND filter 30 in the third example in that the phase compensation layer 43 is disposed between the intermediate layer 42 and the absorption layer 44.

The structure of the absorption layer 44 is the same as with the GND filter 10 in the first example. The absorption layer 44 of the GND filter 40 in the present example includes a first film 441 that is composed of a titanium oxide and a second film 442 that is composed of a niobium oxide.

Figure 12:
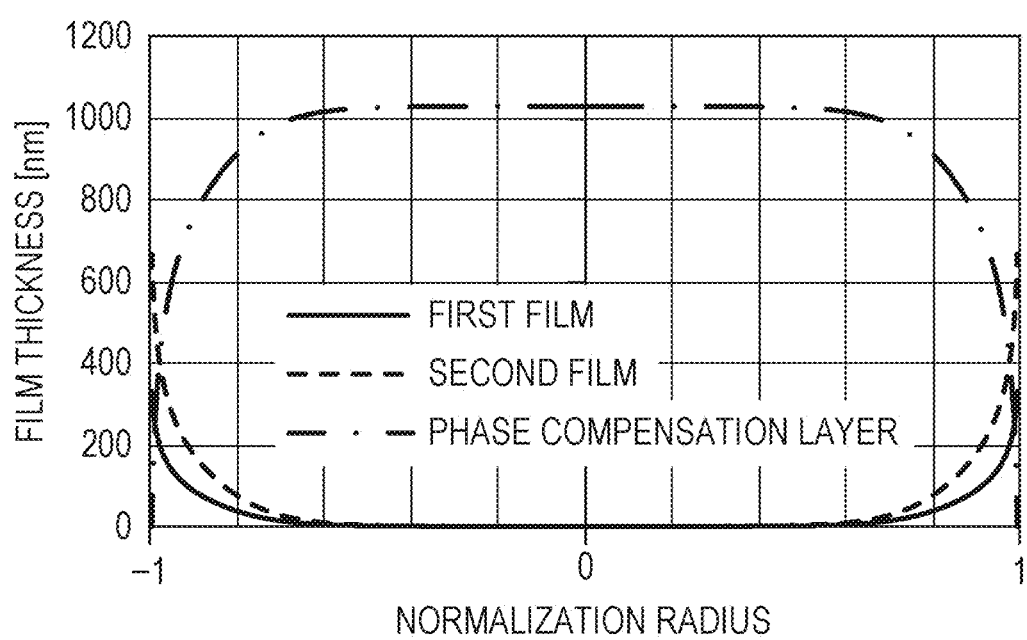
FIG. 12 illustrates the thickness distribution of an absorption layer and a phase compensation layer of the GND filter in the fourth example.
Figure 13:
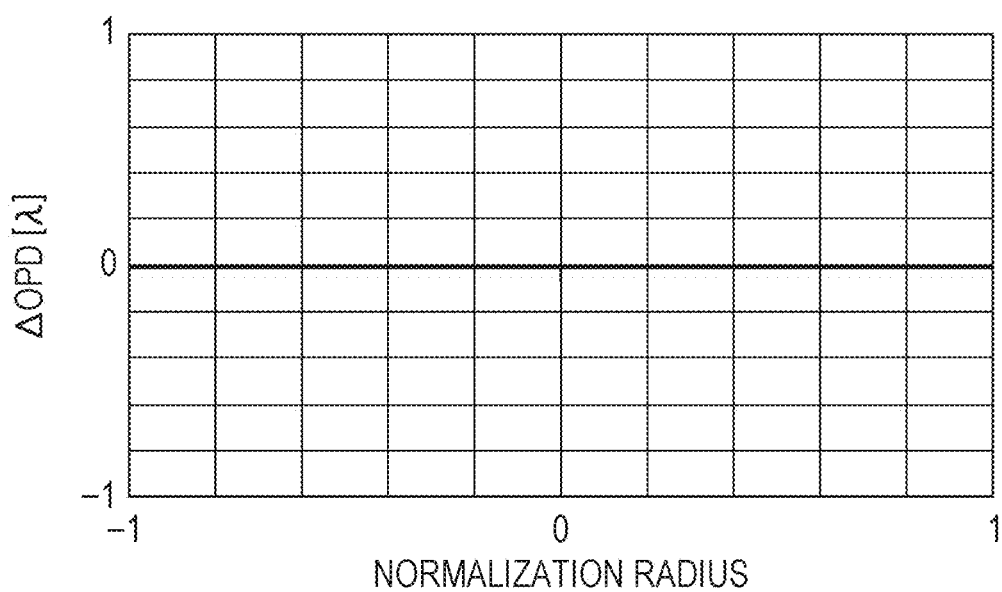
FIG. 13 illustrates a phase shift of a transmitted wavefront of the GND filter in the fourth example.

FIG. 12 illustrates thickness distribution of the absorption layer 44 and the phase compensation layer 43 of the GND filter 40 in the present example. FIG. 13 illustrates a phase shift of a transmitted wavefront. The thickness distribution of the phase compensation layer 43 is designed as illustrated in FIG. 12, and, as illustrated in FIG. 13, this enables the phase shift of the transmitted wavefront due to the thickness distribution of the absorption layer 44 to be compensated.

FIG. 14 illustrate the reflectance of the GND filter 40 and the dependence of the transmittance thereof on the wavelength. FIG. 14A illustrates the reflectance when light is incident from the air side. FIG. 14B illustrates the reflectance when light is incident from the substrate side. FIG. 14C illustrates the transmittance. In FIGS. 14A, 14B, and 14C, the case where the thickness of the absorption layer 44 is 0 nm is illustrated by a solid line, the case where the thickness is 50 nm is illustrated by a dotted line, the case where the thickness is 100 nm is illustrated by a dashed line, the case where the thickness is 200 nm is illustrated by a one-dot chain line, and the case where the thickness is 1000 nm is illustrated by a long dashed line.

In FIGS. 14A and 14B, the reflectance of the GND filter 30 is equal to or less than 4% both upon the air-side incidence and upon the substrate-side incidence. In particular, the reflectance is equal to or less than 2% at or near 550 nm at which the luminosity function is large regardless of the transmittance of the absorption layer 44. It can be understood that the variation in the reflectance due to the variation in the transmittance of the absorption layer 44 is small. In FIG. 14C, the dependence of the transmittance on the wavelength due to the variation in the transmittance of the absorption layer 34 is small, and the transmittance is constant.

TABLE 4

Table 4

| FILM NUMBER | n | d [nm] | k | REMARK |
|---|---|---|---|---|
| — | 1.00000 | — | 0 | AIR |
| 12 | 1.24971 | 105.6 | 0 | SURFACE |
| 11 | 2.21365 | 4.7 | 0 | LAYER 45 |
| 10 | 1.65958 | 23.2 | 0 | |
| 9 | 2.21365 | 11.7 | 0 | |
| 8 | 1.65958 | 29.7 | 0 | |
| 7 | 2.34189 | FILM THICKNESS DISTRIBUTION | 0.1575 | ABSORPTION LAYER 44 |
| 6 | 2.12214 | FILM THICKNESS DISTRIBUTION | 0.1917 | |
| 5 | 2.21365 | FILM THICKNESS DISTRIBUTION | 0 | PHASE COMPENSATION LAYER 43 |
| 4 | 1.65958 | 9.9 | 0 | INTERMEDIATE |
| 3 | 2.21365 | 26.2 | 0 | LAYER 42 |
| 2 | 1.65958 | 20 | 0 | |
| 1 | 2.21365 | 12.6 | 0 | |
| — | 1.80768 | — | | SUBSTRATE 41 |

First Modification

A GND filter 50 that corresponds to an optical element according to a first modification will now be described. In the above examples, each absorption layer includes the first film that is composed of the first material and the second film that is composed of the second material. The present invention, however, is not limited thereto. According to the present modification, the absorption layer is formed of a single film that is composed of, for example, a resin in which particles of the first material and particles of the second material are dispersed.

Figure 17A:
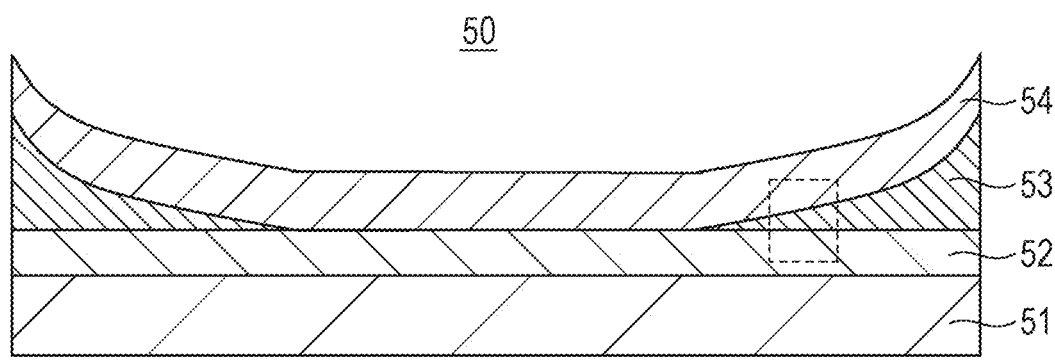
FIGS. 17A and 17B schematically illustrate a GND filter according to a first modification.
Figure 17B:
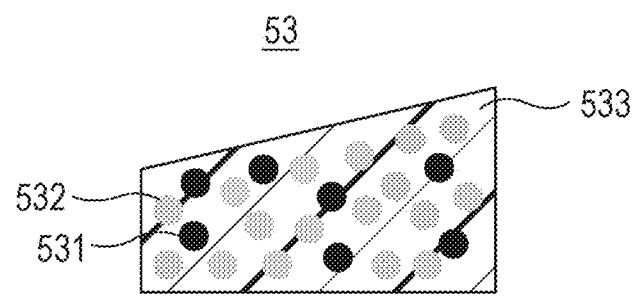

FIG. 17A schematically illustrates the GND filter 50. The GND filter 50 includes an intermediate layer 52, an absorption layer 53, and a surface layer 54 that are arranged in this order from a substrate 51. FIG. 17B illustrates an enlarged view of a region of the absorption layer 53 represented by a dotted line in FIG. 17A. The absorption layer 53 according to the present modification differs from those in the above examples and is composed of a medium that is obtained by dispersing particles of a first material 531 and particles of a second material 532 in a resin 533.

In this case, the extinction coefficient of the absorption layer can be calculated by using the absorption coefficient $\alpha(\lambda)$ that is calculated from the amount of light that the absorption layer absorbs, and an expression of $\alpha(\lambda)=4\pi k(\lambda)/\lambda$.

In the case where the absorption layer is formed of the single film as with the present modification, it is only necessary for the first material and the second material to satisfy the expression (1), and it is only necessary for the extinction coefficient of the absorption layer to satisfy the expression (3). This enables the variation in the dependence of the transmittance on the wavelength due to the variation in the transmittance of the absorption layer, and the variation in the reflectance to be reduced.

To further reduce the variation in the dependence of the transmittance on the wavelength due to the variation in the thickness of the absorption layer, the concentration of the first material and the second material of the absorption layer is preferably adjusted in accordance with the dependence of the absorption coefficient $\alpha_1$ ($\lambda$) of the first material and the absorption coefficient $\alpha_2$ ($\lambda$) of the second material on the wavelength. That is, in the expressions (6) and (6a), $t_1$ is replaced with the concentration of the first material of the absorption layer, and $t_2$ is replaced with the concentration of the second material of the absorption layer, and consequently, the variation in the dependence of the transmittance on the wavelength due to the variation in the thickness of the absorption layer 13 can be further reduced.

In the case where the surface layer is formed, when the expression (8) is satisfied, the variation in the reflectance due to the variation in the thickness of the absorption layer can be further reduced as with the above examples. In the case where the intermediate layer is formed, when the expression (9) or (9a) is satisfied, the variation in the reflectance due to the variation in the thickness of the absorption layer can be further reduced as with the above examples.

The absorption layer according to the present modification differs from each absorption layer in the above examples in that the absorption layer is formed of the single film. Consequently, $N_{abs,sur}$ in the expression (8) is equal to $N_{abs,int}$ in the expression (9) or (9a).

Second Modification

A GND filter 60 that corresponds to an optical element according to a second modification will now be described. In the case of the above examples and the first modification, each absorption layer includes the first material and the second material that satisfy the expression (1) and is formed on a surface of the substrate. The present invention, however, is not limited thereto. According to the present modification, a first absorption layer that includes the first material is formed on a surface of the substrate, and a second absorption layer that includes the second material is formed on the other surface of the substrate.

Figure 18:
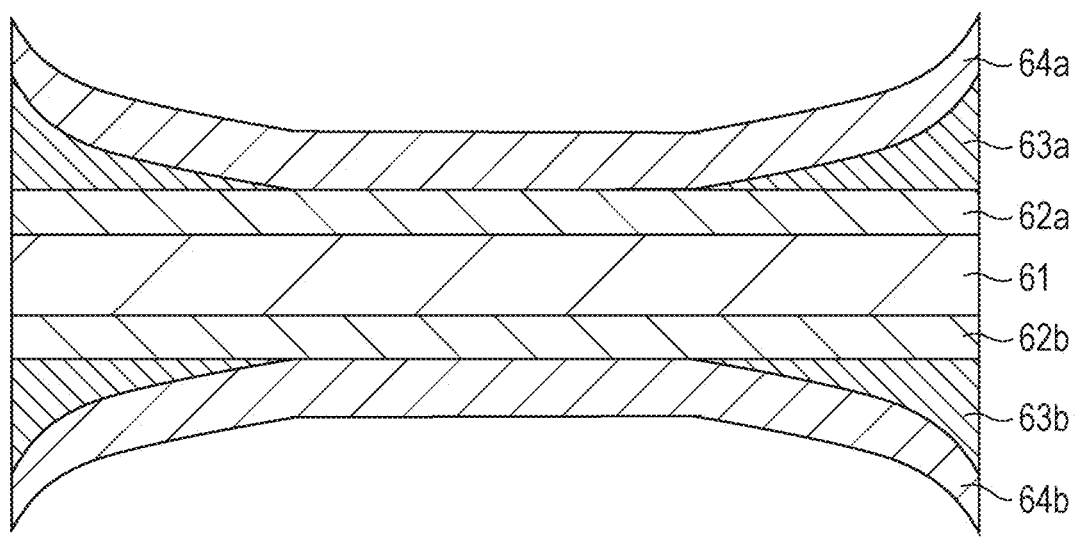
FIG. 18 schematically illustrates a GND filter according to a second modification.

FIG. 18 schematically illustrates the GND filter 60 according to the present modification. The GND filter 60 includes an intermediate layer 62a, a first absorption layer 63a, and a surface layer 64a that are arranged in this order from a substrate 61 on a surface of the substrate 61. An intermediate layer 62b, a second absorption layer 63b, and a surface layer 64b are arranged in this order from the substrate 61 on the other surface of the substrate 62. The thicknesses of the first absorption layer 63a and the second absorption layer 63b vary, and the transmittance thereof varies at different locations of the substrate.

The first absorption layer 63a and the second absorption layer 63b satisfy the expression (3). This enables the variation in the dependence of the transmittance on the wavelength due to the variation in the transmittance of the first absorption layer 63a and the second absorption layer 63b, and the variation in the reflectance to be reduced.

According to the present modification, the thicknesses of the first absorption layer 63a and the second absorption layer 63b vary, and the transmittance thereof varies at different locations of the substrate. However, it is only necessary for the transmittance of the first absorption layer 63a, or the second absorption layer 63b, or both to vary at different locations of the substrate. This enables the GND filter 60 to have transmittance distribution.

The first absorption layer 63a may be formed in a manner in which a thin film is composed of the first material by, for example, vapor deposition as with the above examples, or the first material or the second material is dispersed in a resin as with the first modification. The second absorption layer 63b may be formed in a manner in which a thin film is composed of the second material by, for example, vapor deposition, or the second material is dispersed in a resin as in the first absorption layer 63a.

Optical System

An optical system according to an embodiment of the present invention will now be described.

Figure 19A:
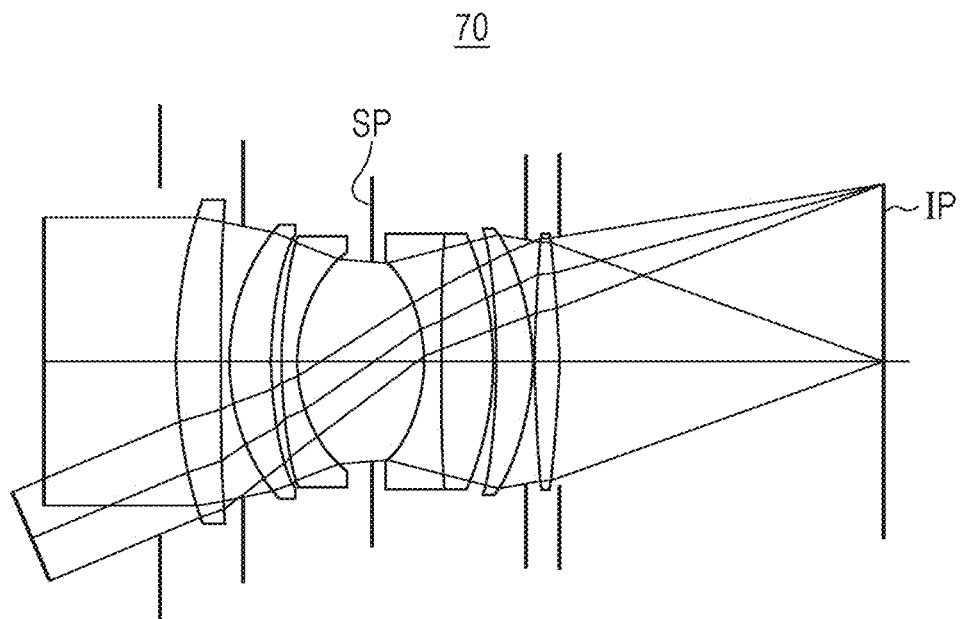
FIGS. 19A and 19B schematically illustrate a sectional view of an optical system and a schematic view of an imaging apparatus.

FIG. 19A illustrates a sectional view of an optical system 70 according to the present embodiment. The optical system 70 includes lenses, which are optical elements. Light from an object passes through the optical system 70, and an image is formed on an imaging plane IP.

At least one of the lenses of the optical system 70 is one of the GND filters in the first to forth examples.

In the GND filters in the first to fourth examples, the variation in the dependence of the transmittance on the wavelength due to the variation in the transmittance of the absorption layer, and the variation in the reflectance are reduced. Consequently, coloring of an image, a ghost, and a flare can be inhibited from occurring, and a high-quality image can be obtained.

The optical system 70 is coaxial and rotationally symmetric. The optical system preferably has a concentric transmittance distribution as illustrated in FIGS. 16A and 16B. As illustrated in FIGS. 1, 4, 7, and 11, the absorption layer is not formed at a central region of the GND filter. This inhibits the amount of light that passes through the GND filter from decreasing. In this case, the transmittance of a luminous flux that passes through the central region of the GND filter is not modulated by the GND filter. Accordingly, the use of the luminous flux that passes through the central region of the GND filter enables autofocus of an imaging apparatus that includes the optical system 70 and has an autofocus function in a phase shift method.

A high-quality blurred image is obtained by an apodization effect of the optical system 70 that includes a GND filter that has transmittance distribution satisfying T ($r_1$)≥T ($r_2$), where T($r_1$) and T ($r_2$) are the transmittance at positions distances $r_1$ and $r_2$ ($r_1$<$r_2$) away from the center of the optical surface.

In the case where at least one of such GND filters is disposed on the light-incident side of a stop SP and at least another one is disposed on the light-emission side thereof, the apodization effect can be effectively achieved with respect to a luminous flux away from the axis, and an image that has high quality over the entire region can be obtained.

Since the absorption layer is not formed at the central region of the GND filter, a blurred image is improved by the apodization effect, and the size of the blurred image can be inhibited from excessively decreasing.

In contrast, in the case where the optical system 70 includes a GND filter that has transmittance distribution satisfying T ($r_1$)≤T ($r_2$), limb darkening of an image can be corrected.

An imaging apparatus that includes the optical system 70 according to the present embodiment will now be described.

Figure 19B:
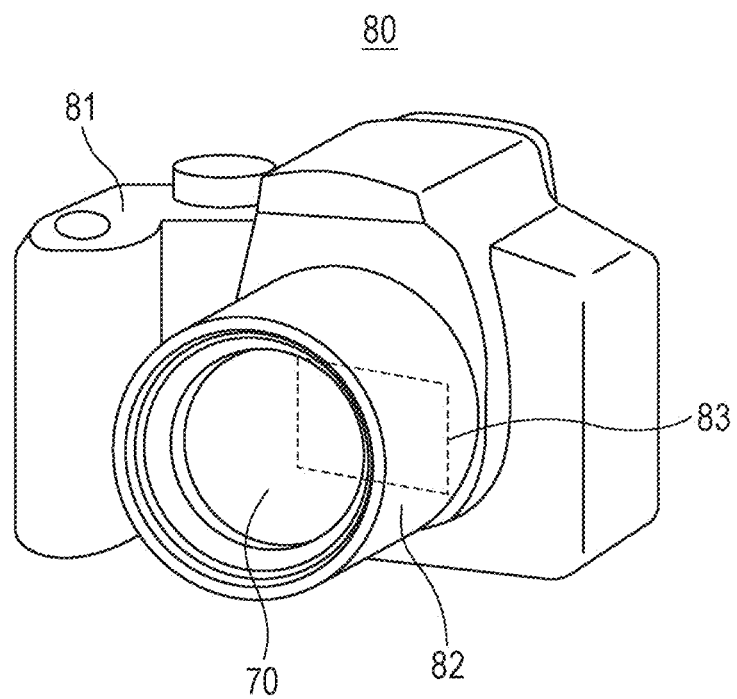

FIG. 19B illustrates a digital camera 80 that corresponds to an imaging apparatus according to the present embodiment. The digital camera 80 includes a lens 82 that includes the optical system 70 according to the present embodiment described above. An imaging element 83 such as a CCD or CMOS sensor is disposed on a main body 81 on the imaging plane IP of the optical system 70.

The digital camera 80 that includes the optical system 70 can inhibit coloring of an image, a ghost, and a flare from occurring and obtain a high-quality image.

In an example illustrated in FIG. 19B, the main body 81 and the lens 82 are integrally formed. The present invention may be used for a lens device that is attachable to and detachable from the main body of the imaging apparatus. Such a lens device is used as, for example, an interchangeable lens for a single-lens camera. In this case, it can be understood that FIG. 19B illustrates the lens device 82 that includes the optical system 70 and that is mounted on the main body 81 of the imaging apparatus.

The optical system according to the present invention is not limited to an imaging apparatus such as a digital camera and a lens device (interchangeable lens) that is attachable to and detachable from the main body of the imaging apparatus. For example, the optical system according to the present invention may be used for, for example, binoculars and microscopes.

The preferred embodiments and examples of the present invention are described above. The present invention, however, is not limited to the embodiments and the examples. Various combinations, modifications, and alterations can be made within the range of the spirit thereof.

Finally, Tables 5 summarizes the values in the first to fourth examples.

coefficient of which, at a wavelength of 400 nm, is larger than an absorption coefficient at a wavelength of 700 nm, and wherein an extinction coefficient of the absorption layer is equal to or less than 0.5 and equal to or larger than 0.005 at a wavelength of 400 nm to 700 nm, wherein the intermediate layer includes a film a refractive index of which is between $N_{abs,\ int}$ and $N_{sub}$, where $N_{abs,\ int}$ is a refractive index of the film that is nearest to the intermediate layer among the films that are included in the absorption layer, and $N_{sub}$ is a refractive index of the substrate.

2. The optical element according to claim 1, wherein the absorption layer includes a first film that includes the first material and a second film that includes the second material, and wherein the first film, or the second film, or both have a thickness that varies at the different locations of the substrate.

3. The optical element according to claim 2, wherein the following conditional expression of is satisfied:

$$|\Delta N_{abs}|<0.25$$

where $\Delta N_{abs}$ is a difference between refractive indices of the adjoining films that are included in the absorption layer.

4. The optical element according to claim 2, wherein the following conditional expression is satisfied:

$$-1.5 \leq (a_1/a_2)\cdot(t_1/t_2) \leq -0.7$$

where $a_1$ is a coefficient of λ when a linear approximation of the absorption coefficient of the first material with respect to a wavelength λ is obtained by a least-squares

TABLE 5

| | FIRST EXAMPLE | SECOND EXAMPLE | THIRD EXAMPLE | FOURTH EXAMPLE | RELATED CONDITIONAL EXPRESSION |
|---|---|---|---|---|---|
| $|\Delta N_{abs}|$ | 0.2198 | 0.2025 | 0.2198 | 0.2198 | (4) $|\Delta N_{abs}| < 0.25$ |
| $|\Delta k_{abs}|$ | 0.0342 | 0.0088 | 0.0342 | 0.0342 | (5) $|\Delta k_{abs}| < 0.20$ |
| $|N_{sub} - N_{cmp}|$ | — | — | 0.0056 | — | (11) $|N_{sub} - N_{cmp}| < 0.10$ |
| $|N_{abs} - N_{cmp}|$ | — | — | — | 0.0915 | (12) $|N_{abs} - N_{cmp}| < 0.15$ |

The present invention is not limited to the above embodiments, and various modifications and alterations can be made without departing from the spirit and scope of the present invention. Accordingly, the following claims are attached to make the scope of the present invention public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An optical element comprising:
  a substrate;
  an absorption layer, transmittance of which varies at different locations of the substrate; and
  an intermediate layer that is disposed between the substrate and the absorption layer,
  wherein the absorption layer includes a first material an absorption coefficient of which, at a wavelength of 400 nm, is lower than an absorption coefficient at a wavelength of 700 nm, and a second material an absorption method, and $a_2$ is a coefficient of λ when a linear approximation of the absorption coefficient of the second material with respect to the wavelength λ is obtained by the least-squares method, $a_1$ and $a_2$ are obtained in a wavelength band of wavelengths in at least a part of a range from a wavelength of 400 nm to a wavelength of 700 nm in which the absorption coefficient of either the first material or the second material increases with respect to the wavelengths, and the absorption coefficient of the other decreases with respect to the wavelengths, and $t_1$ is a thickness of the first film and $t_2$ is a thickness of the second film at a position at which a thickness of the absorption layer is a maximum.

5. The optical element according to claim 2, wherein the first material is a titanium oxide, and wherein the following conditional expression is satisfied:

$$-10 < a_1/a_2 \leq -1$$

where $a_1$ is a coefficient of λ when a linear approximation of the absorption coefficient of the first material with respect to a wavelength λ is obtained by a least-squares method, and $a_2$ is a coefficient of λ when a linear approximation of the absorption coefficient of the second material with respect to the wavelength λ is obtained by the least-squares method, $a_1$ and $a_2$ are obtained in a wavelength band of wavelengths in at least a part of a range from a wavelength of 400 nm to a wavelength of 700 nm in which the absorption coefficient of either the first material or the second material increases with respect to the wavelengths, and the absorption coefficient of the other decreases with respect to the wavelengths.

6. The optical element according to claim 2, wherein the first material is a titanium oxide, and
wherein the first film of the absorption layer is nearer than the second film to the substrate.

7. The optical element according to claim 1, further comprising: a surface layer,
wherein the absorption layer is disposed between the substrate and the surface layer, and
wherein the surface layer includes a film a refractive index of which is larger than 1 and less than $N_{abs,\,sur}$, where $N_{abs,\,sur}$ is a refractive index of the film that is nearest to the surface layer among the films that are included in the absorption layer.

8. The optical element according to claim 1, wherein the absorption layer has a thickness that varies at the different locations of the substrate, and
wherein the optical element includes a phase compensation layer a thickness of which increases in a direction opposite a direction in which the thickness of the absorption layer increases.

9. The optical element according to claim 8, wherein the phase compensation layer is adjacent to the substrate, and
wherein the following conditional expression is satisfied:

$$|N_{sub}-N_{cmp}|<0.10$$

where $N_{sub}$ is a refractive index of the substrate, and $N_{cmp}$ is a refractive index of the phase compensation layer.

10. The optical element according to claim 8, wherein the phase compensation layer is adjacent to the absorption layer, and
wherein the following conditional expression is satisfied:

$$|N_{abs,c}-N_{cmp}|<0.15$$

where $N_{abs,\,c}$ is a refractive index of the film that is adjacent to the phase compensation layer among the films that are included in the absorption layer, and $N_{cmp}$ is a refractive index of the phase compensation layer.

11. The optical element according to claim 1, wherein a reflectance of the optical element when light is incident from the absorption layer toward the substrate at a position at which the transmittance of the absorption layer is a minimum is equal to or less than 4% with respect to a wavelength of 400 nm to 700 nm.

12. The optical element according to claim 1, wherein a reflectance of the optical element when light is incident from the substrate toward the absorption layer at a position at which the transmittance of the absorption layer is a minimum is equal to or less than 4% with respect to a wavelength of 400 nm to 700 nm.

13. The optical element according to claim 1, wherein the absorption layer includes concentrically distributed regions each of which has the same transmittance.

14. An optical system comprising: optical elements, wherein at least one of the optical elements is the optical element according to claim 1.

15. An imaging apparatus comprising: an imaging element; and the optical system according to claim 14.

16. A lens device that is attachable to and detachable from a main body of an imaging apparatus, the lens device comprising: the optical system according to claim 14.

17. An optical system comprising:
a stop;
at least one of the optical element comprising:
a substrate; and
an absorption layer, transmittance of which varies at different locations of the substrate,
wherein the absorption layer includes a first material an absorption coefficient of which, at a wavelength of 400 nm, is lower than an absorption coefficient at a wavelength of 700 nm, and a second material an absorption coefficient of which, at a wavelength of 400 nm, is larger than an absorption coefficient at a wavelength of 700 nm, and
wherein an extinction coefficient of the absorption layer is equal to or less than 0.5 at a wavelength of 400 nm to 700 nm,
wherein the at least one optical element is disposed on a light-incident side of the stop; and
at least one of the optical element according to any claim 1 that is disposed on a light emission side of the stop.

18. An optical element comprising:
a substrate; and
an absorption layer, transmittance of which varies at different locations of the substrate,
wherein the absorption layer includes a first material an absorption coefficient of which, at a wavelength of 400 nm, is lower than an absorption coefficient at a wavelength of 700 nm, and a second material an absorption coefficient of which, at a wavelength of 400 nm, is larger than an absorption coefficient at a wavelength of 700 nm, and
wherein an extinction coefficient of the absorption layer is equal to or less than 0.5 and equal to or larger than 0.005 at a wavelength of 400 nm to 700 nm,
wherein the absorption layer includes a first film that includes the first material and a second film that includes the second material, and
wherein the first film, or the second film, or both have a thickness that varies at the different locations of the substrate,
wherein the following conditional expression is satisfied:

$$|\Delta k_{abs}|<0.2$$

where $\Delta k_{abs}$ is a difference between extinction coefficients of the adjoining films that are included in the absorption layer.

19. An optical element comprising:
a substrate; and
an absorption layer, transmittance of which varies at different locations of the substrate,
wherein the absorption layer includes a first material that absorbs a part of incident light and a second material that absorbs a part of the incident light,
wherein the first material is a titanium oxide an extinction coefficient of which, at a wavelength of 400 nm to 700 nm, is equal to or less than 0.5 and equal to or larger than 0.005, and
wherein the second material is a niobium oxide or a tantalum oxide an extinction coefficient of which, at a wavelength of 400 nm to 700 nm, is equal to or less than 0.5 and equal to or larger than 0.005.

20. An optical element comprising:
a substrate;

a first absorption layer that includes a first material an absorption coefficient of which, at a wavelength of 400 nm, is lower than an absorption coefficient at a wavelength of 700 nm; and a second absorption layer that includes a second material an absorption coefficient of which, at a wavelength of 400 nm, is larger than an absorption coefficient at a wavelength of 700 nm, wherein the first absorption layer, or the second absorption layer, or both have transmittance that varies at different locations of the substrate, and wherein extinction coefficients of the first absorption layer and the second absorption layer are equal to or less than 0.5 and equal to or larger than 0.005 at a wavelength of 400 nm to 700 nm.

21. An optical element comprising:

a substrate;

a first absorption layer that includes a titanium oxide an extinction coefficient of which, at a wavelength of 400 nm to 700 nm, is equal to or less than 0.5 and equal to or larger than 0.005, the titanium oxide absorbing a part of incident light; and a second absorption layer that includes a niobium oxide or a tantalum oxide an extinction coefficient of which, at a wavelength of 400 nm to 700 nm, is equal to or less than 0.5 and equal to or larger than 0.005, the niobium oxide or the tantalum oxide absorbing a part of the incident light, wherein transmittance of the first absorption layer, or transmittance of the second absorption layer, or both vary at different locations of the substrate.

* * * * *